US012770893B2

(12) United States Patent
Domanski et al.

(10) Patent No.: US 12,770,893 B2
(45) Date of Patent: Oct. 20, 2026

(54) ELECTROCHEMICAL CELL STACK

(71) Applicant: Ceres Intellectual Property Company Limited, Horsham (GB)

(72) Inventors: Tomasz Domanski, Horsham (GB); Matthew Harrington, Horsham (GB)

(73) Assignee: Ceres Intellectual Property Company Limited, Horsham (GB)

( * ) Notice: Subject to any disclaimer, the term of this patent is extended or adjusted under 35 U.S.C. 154(b) by 838 days.

(21) Appl. No.: 18/023,073

(22) PCT Filed: Aug. 12, 2021

(86) PCT No.: PCT/EP2021/072533

§ 371 (c)(1),
(2) Date: Feb. 24, 2023

(87) PCT Pub. No.: WO2022/043087

PCT Pub. Date: Mar. 3, 2022

(65) Prior Publication Data

US 2023/0352700 A1 Nov. 2, 2023

(30) Foreign Application Priority Data

Aug. 26, 2020 (GB) ..................................... 2013369
Aug. 26, 2020 (GB) ..................................... 2013374

(51) Int. Cl.
*H01M 8/0256* (2016.01)
*C25B 9/01* (2021.01)
(Continued)

(52) U.S. Cl.
CPC ............ *H01M 8/0256* (2013.01); *C25B 9/01* (2021.01); *C25B 9/77* (2021.01); *C25B 13/07* (2021.01);
(Continued)

(58) Field of Classification Search
CPC .. H01M 8/0256; H01M 8/0271; H01M 8/248; H01M 8/2432; H01M 8/2483
See application file for complete search history.

(56) References Cited

U.S. PATENT DOCUMENTS 10,270,119 B2 4/2019 Leah et al.
2001/0046619 A1 11/2001 Allen
(Continued)

FOREIGN PATENT DOCUMENTS

CN 110629150 A 12/2019
IN 355835 1/2021
(Continued)

OTHER PUBLICATIONS

Intellectual Property Office of India, Examination Report Received in Application No. 202317016724, dated May 8, 2026.
(Continued)

*Primary Examiner* — Karie O'Neill Apicella
(74) *Attorney, Agent, or Firm* — Snell & Wilmer L.L.P.

(57) ABSTRACT

An electrochemical cell assembly (1400) comprising a base plate (308) and a top plate (303) between which a stack of planar cell units (306) and at least one electrical end plate (1402, 1407) are disposed in compression. The electrical end plate (1402, 1407) comprises a two-layer construction in which a first layer (1416, 1419) and a second layer (1417, 1420) formed of different respective materials are permanently connected together to form a single conductive body. The first layer (1416, 1419) of the electrical end plate (1402, 1407) is electrically connected to an external electrical terminal (301, 505) of the cell assembly, and the second layer (1417, 1420) of the electrical end plate (1402, 1407) has an outwardly facing side having a first electrically conductive ceramic layer (1418, 1824) bonded thereto that
(Continued)

is in face-to-face abutment with, and in electrical contact with, an adjacent cell unit (306).

17 Claims, 16 Drawing Sheets

(51) Int. Cl.

| | |
|---|---|
| ***C25B 9/77*** | (2021.01) |
| ***C25B 13/07*** | (2021.01) |
| ***H01M 8/0217*** | (2016.01) |
| ***H01M 8/0273*** | (2016.01) |
| ***H01M 8/12*** | (2016.01) |
| ***H01M 8/18*** | (2006.01) |
| ***H01M 8/2432*** | (2016.01) |
| ***H01M 8/248*** | (2016.01) |
| ***H01M 8/2483*** | (2016.01) |

(52) U.S. Cl.
CPC ......... *H01M 8/0217* (2013.01); *H01M 8/186* (2013.01); *H01M 8/2432* (2016.02); *H01M 8/248* (2013.01); *H01M 8/2483* (2016.02); *H01M 8/0273* (2013.01); *H01M 8/12* (2013.01); *H01M 2008/1293* (2013.01)

(56) References Cited

U.S. PATENT DOCUMENTS

| | | | | |
|---|---|---|---|---|
| 2004/0241524 | A1 | 12/2004 | Ruge et al. | |
| 2005/0095485 | A1 | 5/2005 | O'Brien et al. | |
| 2007/0231676 | A1* | 10/2007 | Cassidy | H01M 8/0206 429/495 |
| 2009/0053571 | A1 | 2/2009 | Obika et al. | |
| 2010/0273076 | A1 | 10/2010 | Kunitake | |
| 2013/0130146 | A1 | 5/2013 | Petersen et al. | |
| 2016/0102410 | A1 | 4/2016 | Stoehr et al. | |
| 2017/0162879 | A1* | 6/2017 | Tomoshige | H01M 8/0228 |
| 2019/0013539 | A1 | 1/2019 | Giroud et al. | |

FOREIGN PATENT DOCUMENTS

| | | | |
|---|---|---|---|
| JP | H05326000 | A | 12/1993 |
| WO | 2007001189 | A1 | 1/2007 |

OTHER PUBLICATIONS

Ministry of Intellectual Property (MOIP), Office Action Received in Application No. 10-2023-7010109, dated May 18, 2026.

* cited by examiner

ELECTROCHEMICAL CELL STACK

CROSS-REFERENCE TO RELATED APPLICATIONS

This application is a national stage entry of International Patent Application No. PCT/EP2021/072533, filed 12 Aug. 2021, entitled "ELECTROCHEMICAL CELL STACK," which claims priority to Great Britain Patent Application Nos. 2013369.0, filed on 26 Aug. 2020, and 2013374.0, filed on 26 Aug. 2020, the disclosures of which are hereby incorporated by reference in their entirety.

FIELD OF THE INVENTION

The present invention relates to electrochemical cell stacks, in particular, fuel cell stacks and electrolyser cell stacks, and to the design of their electrical end plates. The cell stacks of the present invention include cells of solid oxide, polymer electrolyte membrane, and molten carbonate types. The present invention more specifically relates to solid oxide fuel cell (SOFC) and solid oxide electrolyser cell (SOEC) stacks, and these may include metal-supported solid oxide fuel cell (MS-SOFC) or electrolyser cell stacks (MS-SOEC).

BACKGROUND TO THE INVENTION

Some fuel cell units can produce electricity by using an electrochemical conversion process that oxidises fuel to produce electricity. Some fuel cell units can also, or instead, operate as regenerative fuel cells (or reverse fuel cells) units, often known as electrolyser fuel cell units, for example to separate hydrogen and oxygen from water, or carbon monoxide and oxygen from carbon dioxide. They may be tubular or planar in configuration. Planar fuel cell units may be arranged overlying one another in a stack arrangement, for example 100-200 fuel cell units in a stack, with the individual fuel cell units arranged electrically in series.

A solid oxide fuel cell (SOFC) that produces electricity is based upon a solid oxide electrolyte that conducts negative oxygen ions from a cathode to an anode located on opposite sides of the electrolyte. For this, a fuel, or reformed fuel, contacts the anode (fuel electrode) and an oxidant, such as air or an oxygen rich fluid, contacts the cathode (air electrode). Conventional ceramic-supported (e.g. anode-supported) SOFCs have low mechanical strength and are vulnerable to fracture. Hence, metal-supported SOFCs have recently been developed which have the active fuel cell component layer supported on a metal substrate. In these cells, the ceramic layers can be very thin since they only perform an electrochemical function: that is to say, the ceramic layers are not self-supporting but rather are thin coatings/films laid down on and supported by the metal substrate. Such metal supported SOFC stacks are more robust, lower cost, have better thermal properties than ceramic-supported SOFCs and can be manufactured using conventional metal welding techniques.

A solid oxide electrolyser cell (SOEC) may have the same structure as an SOFC but is essentially that SOFC operating in reverse, or in a regenerative mode, to achieve the electrolysis of water and/or carbon dioxide by input of electrical energy and using the solid oxide electrolyte to produce hydrogen gas and/or carbon monoxide and oxygen.

The present invention is directed at a stack of repeating electrochemical cell units and concerns the design of their electrical end plates (power take-off or delivery). It is thus applicable to various types of fuel and electrolyser cells, for example, based on solid oxide electrolytes, polymer electrolyte membranes, or molten electrolytes. For convenience, "cell units" is used to refer to "electrochemical cell units" including fuel or electrolyser cell units.

The electrical energy produced by a fuel cell (or input to an electrolyser cell) may be transferred through a stack of cell units and transferred from (or to) the stack using two electrical studs (of opposite electrical polarity) and associated electrical end plates which make electrical contact between the studs and the ends of the stack. The electrical studs and electrical end plates may also be referred to as positive and negative "power take offs", which terminology is used for convenience regardless of whether the power is being taken off (as in case of fuel cell) or delivered (as in case of electrolyser cell).

The stack is typically enclosed in a vessel to form a fluid volume and thereby to retain one of the fluids (fuel or air and/or exhaust gasses) for use in—or exhaust from—the stack. The electrical studs typically pass through the vessel in order to allow electrical energy to be transferred between the stack and a load or source external to the stack (the electrical stud, or bolt, passed through an opening in the vessel for external connection, the (distal) portion of the stud external to the vessel may form a terminal). A fluid seal is typically required to be maintained between the power take offs and the vessel in order to maintain the integrity of the fluid volume enclosed by the vessel. Operating a fuel cell (for example an SOFC) system where the cell stack operates in the 450-650 DegC range (for example, intermediate-temperature solid oxide fuel cell IT-SOFC) results in a challenging set of technical problems being encountered in transferring the electrical energy to/from the stack while maintaining a fluid seal.

JPH05326000 A relates to a fuel cell stack with a self-supporting electrochemically active fuel cell layers. Current collecting plates are disposed to each end of the fuel cell stack, and function as electrical end plates. The current collecting plates have an undercoat and a ceramic laminated on a metal plate (SUS 310). The undercoat and ceramic are deposited on the metal plate by spraying. JPH05326000 A does not disclose any electrical studs, nor if there exists a vessel in which the stack and current collecting plates are enclosed. Therefore, JPH05326000 A does not address how to transfer electrical energy from the stack while maintaining a fluid seal between a power take off and a vessel.

US 2016/102410 A1 relates to a fuel cell system having a stack cover plate positioned between an end plate and a stack comprising self-supporting MEA cell units. The stack cover plate has a two layer construction of a contacting plate and a separator half plate, both formed from stainless steel. The contacting plate is provided with a conductor which passes through the plastic end plate to provide a connection between the stack and outside of the system. The end plate and stack cover plate are also provided with a channel for delivery of a gas or coolant. A ring-shaped recess in the end plate surrounds the channel and a sealing ring is provided therein. In an uncompressed state the sealing ring projects beyond the end plate. Compression in the stacking direction is used to compress the sealing ring so that the end plate and contacting plate touch one another.

FIG. 1 is drawn from US 2001/0046619 A1. FIG. 1 shows a fuel cell stack 20 enclosed within a housing 23. An internal inlet manifold 6 provides for the delivery of the fuel stream 4, and an internal outlet manifold 7 provides for the removal of fuel stream 4. An external manifold 9 provides for delivery of the oxidant stream 3 into an inlet chamber 41, and an external manifold 8 provides for removal of the oxidant stream 3 from an outlet chamber 33. A negative pole 30, or anode end, of fuel cell stack 20 is separated from housing 23 by a dielectric spacer 31. A power take-off terminal 32 extends from beneath fuel cell stack 30, and extends into outlet chamber 33 of housing 23. An electrically conductive bus bar 34 is positioned adjacent the power take-off terminal 32 exterior to housing 23. A dielectric spacer 35 is disposed between the bus bar 34 and housing 23. An electrically conductive fastener 36 connects power take-off terminal 32 to bus bar 34 via an aperture 37 formed in housing 23. A dielectric spacer 38 isolates fastener 36 from the surface of aperture 37 extending through housing 23. A positive pole 21, or cathode end, of fuel cell stack 20 is in intimate electrical contact with housing 23. An electrically conductive bus bar 39 is positioned exterior to housing 23, and is attached to housing 23 via an electrically conductive fastener 40. Electricity generated within fuel cell stack 20 may flow from negative pole 30 of fuel cell stack 20 through power take-off terminal 32 and bus bar 34 to an external electrical circuit to power an electrical appliance or machine. Electric current may return to the positive pole 21 of fuel cell stack 20 through bus bar 39 and housing 23.

In US 2001/0046619 A1, the electrically conductive fasteners 36, 40 are under tension in order to seal the housing 23 (and so maintain a fluid volume in the chamber 33), the seal may be maintained via the dielectric spacer 38, for example a ceramic plate.

FIG. 2 is drawn from WO 2007/001189 A1. FIG. 2 is a diagram showing a housing comprising a wall 45 and a first end plate 42 and a second end plate 48. A fuel cell stack 3 is compressed between end plates 42 and 48. The end plate 42 functions also as an electrical end plate and is connected to an electrical end bolt 50. The cell stack 43 is arranged between said electrical end plate 42 and a second electrical end plate 46. The electrical end plate 46 is connected to an electrical bolt 51 and inserted into the housing and electrically insulated from the housing. The insulation is achieved by an insulation ring 49 between bolt 51 and end plate 48 and an electrical insulating elastic pad 47. The elastic pad 47 is placed between the electrical end plate 46 and end plate 48. Bolts 50 and 51 are described in WO 2007/001189 A1 as being "electrical bolts", and so function as power take off from the stack 43. Elastic pad 47 provides sealing around the electrical bolt 51 and to insulate electrical end plate 46 from the housing (including end plate 48 and wall 45). Electrical bolt 50 is a power take off in electrical contact with the end plate 42, the wall 45, and the end plate 48. The potential difference between the electrical bolt 51 (of the opposite polarity to the bolt 421 and therefore also 42, 45, and 48) is equal to the potential difference across the cell stack 43. Thus, there is a high probability of electrical sparks and shorting between the end plate 48 and electrical bolt 51.

Space 44 is described in WO 2007/001189 A1 as a "void-space". WO 2007/001189 A1 does not explain how the stack 43 is compressed, nor how the fuel and oxidant (and respective exhaust) volumes are separated nor how those volumes are in communication with external connectors.

In the arrangement of US 2001/0046619 A1, sub-assemblies for power take off are under tension in order to maintain a seal and thereby define a fluid volume. Electrochemical cells, including intermediate-temperature solid oxide fuel cells, operate at relatively high temperatures, to maintain a seal at such temperatures typically requires ceramic seals, which themselves require high compression loads in order to be effective. Maintaining high compression loads in such environments is challenging and requires components under tension to be manufactured from expensive materials, such as Inconel, to resist creep. Creep in such parts reduces the compression load and leads to failure of the electrochemical cell system through loss of sealing (either by reduction in compressive force below minimum required for a seal between components, or by catastrophic failure of the component subject to creep). Similar disadvantages are apparent for the electrochemical cell described in WO 2007/001189 A1.

The present invention seeks to address, overcome or mitigate at least one of the prior art disadvantages.

SUMMARY OF THE INVENTION

In a first aspect, there is provided an electrochemical cell assembly comprising:

a base plate and a top plate between which a stack of planar cell units and at least one positive and at least one negative electrical end plate are disposed in compression by means of compression means acting between the base plate and top plate;

wherein at least one of the electrical end plates is connected or integrally formed with, and in electrical contact with, an electrical stud that extends from a base portion of the at least one electrical end plate and passes through an opening in one of the base plate and top plate to form an electrical terminal; and, wherein a fluidic seal is maintained by the compression means between the base portion and the respective one of the base plate and top plate, so as to prevent loss of fluid through the opening.

An electrical terminal, positioned externally on the electrochemical cell assembly for accessibility, requires an opening in the assembly. However, fluid from within the assembly should not be lost through the opening. Prior art solutions for sealing the opening are frequently subject to creep, weakening the seal, and leading to system failure. The electrochemical cell assembly of the claims advantageously uses the compression means used for maintaining compression in the stack of planar cell units to seal the opening (via action of the compression means on the base portion).

Preferably, the electrical end plate and respective electrical stud are separate components connected by a weld. Alternatively, the electrical end plate and respective electrical stud may be unitary, or may be separate components connected by screwing the electrical stud into a threaded recess in the electrical end plate that does not fully penetrate the electrical end plate (in the latter case, the electrical stud may be welded in place). In cases where the stud and electrical end plate are separate components joined together, the base portion may be part of either component.

Top plate and base plate are used to refer to the plates positioned to the outside of the stack and between which compression is applied. The names "top plate" and "base plate" are merely used for convenience, they may be interchanged and should not be construed as limiting the orientation of the assembly. The compression means may be connected (e.g. in tension) between those plates (i.e. inwardly disposed thereof), for example, as compression plates or skirts, or the compression means may include traditional compression bolts and fasteners gripping and compressing the plates towards each other.

The positive and negative electrical end plates may be in electrical contact with opposite ends of the stack of planar cell units. The electrical studs may be in electrical contact with respective electrical end plates. There may be one or more electrical studs in electrical contact with each of the positive and negative electrical end plates. A distal end (away from the electrical end plate) of the studs may be referred to as an electrical terminal, the terminal being where the stud (and thereby the stack) provides for external connection. The electrical studs may be referred to as power take off studs, for transferring power out of the stack of planar cell units, when the electrochemical cell assembly is operated as a fuel cell. The electrical studs may be referred to as power supply studs, for transferring power to the stack of planar cell units, when the electrochemical cell assembly is operated as an electrolyser cell. In some cases the positive and negative electrical end plates may also be referred to as an endpole and a monopole, respectively.

The opening in the base plate and/or top plate may be a hole or aperture which fully penetrates the base plate or top plate, and may be of any cross section. The opening is of sufficient size to allow the electrical stud to pass through the opening from one side of the base or top plate to the other. The electrical stud passes through the opening in the base plate and/or top plate to provide an external (to the stack and its enclosure, formed at least in part by the base plate and top plate) electrical connection to the stack of planar cell units.

The compression means may maintain a compression (i.e. a compressive force) between the base plate and top plate which was applied during manufacture of the electrochemical cell assembly. The compression provides good electrical contact between each of the planar cell units (also referred to as repeat units) in the stack, between the electrical end plates and adjacent planar cell units, and maintains compression in fluidic seals between the base plate and top plate. The seals may be formed by gaskets, for example where gaskets alternate with cell units along the length (i.e. in the stacking direction) of the stack, with the gaskets sealing an internal manifold for delivering fluid to fluid volumes within each cell unit, and thereby separating a first and second fluid volume (e.g. a fuel volume and an oxidant volume).

A fluidic seal between one or both of the electrical end plates and the respective of the base plate and top plate is maintained by the compression means. This also means that the opening in the base plate and/or top plate is sealed by the compression means (while allowing the electrical stud to pass through the opening). In turn, this means that the electrical stud need not itself maintain a seal of the opening through which it passes. In other words, the electrical stud is itself not a fastener or bolt, and need not be under tension to maintain the seal of the opening. It is advantageous to reduce the number of components under tension because components under tension in a fuel or electrolyser cell environment must normally be manufactured from expensive creep resistant materials, in order to resist creep across the range of operation conditions (for example across a temperature range from atmospheric temperatures of around 20 degrees C. to much warmer operating temperatures of at least 400 degrees C.). Any component under tension should provide adequate sealing force over a large range of temperatures but should also do so over many thermal cycles over the lifetime of the cell unit, with loss of sealing likely to cause failure of an electrochemical cell system. Inconel is one such creep-resistant material. However, using the compression means to seal the opening through which the electrical stud passes means that no electrical stud-related component need be under tension, thereby obviating the creep problem, and meaning that the electrical stud need not be manufactured from a creep resistant material, but the material may instead be chosen for its electrical properties.

Furthermore, the electrical stud may be free to expand and contract (relative to the base or top plate through which it passes) with changes of temperature. Thus, thermal expansion of the electrical stud (and related components, e.g., the electrical end plates) need not affect sealing of the opening in the base and/or top plate. The seal of the opening in the base and/or top plate (between the base and/or top plate and respective electrical end plate) prevents escape from the assembly of gas through the opening (this gas is typically that of the second fluid volume, e.g. oxidant, the first fluid volume, e.g. for fuel, comprising the internal manifolds and volume between support and separator plates of a cell unit). Gaskets may be positioned between the electrical end plate and the respective base or top plate to maintain the seal therebetween.

Preferably, each of the base plate and top plate is respectively electrically insulated from (and hence not at the same potential as either end of) the stack of planar cell units by means of a respective insulating layer(s) provided between the respective end of the stack of planar cell units and the respective base plate and top plate. Hence, the compression means will also act on the insulating plate. In this preferred case, the baseplate, top plate, and compression means are not at the same potential as either end of the stack of planar cell units, and so are not at the same potential as the electrical stud(s). In other words, their potential floats relative to the electrical stud(s) because the electrical stud(s) are not in electrical contact with the base plate, top plate, and compression means. Thus, where the electrical stud passes through base plate or top plate, there may be a relatively low potential difference between the electrical stud and the base plate or top plate (which means there is a low potential gradient therebetween even if the gap therebetween is small) and so a minimised risk of shorting between electrical stud(s) and the base plate and/or top plate.

In an example, the electrical stud passes though the opening in the base plate or top plate with an airgap therebetween. Thus, the electrical stud is not in electrical communication with the base plate or top plate. In other words, the base plate and/or top plate is not at the same potential as the stack and the electrical stud, and is at a floating potential relative to the electrical stud(s).

In an alternative example, the electrical stud passes though the opening in the base plate or top plate with an electrically insulating sleeve therebetween. The sleeve (which may also be referred to as a collar) may be manufactured from mica or a ceramic material.

The electrically insulating sheet may be mica or a ceramic material, which improves electrical isolation between the electrical end plate and respective base plate or top plate. Gaskets, of the same type as used elsewhere in the assembly, may be positioned between the electrical end plate and the electrically insulating sheet, and between the electrically insulating sheet and the base plate and/or top plate. The gaskets form a good fluidic seal between respective plates/sheets. Use of the same type (e.g. thickness, plan view dimension, and material) of gaskets throughout the assembly (i.e. the same type of gasket between the stack of planar cell units and the electrical end plates, and between the electrical end plates and respective base or top plate) reduces part count, thereby cost, and ensures consistent transfer of compression through the assembly. The gaskets may be preformed gaskets or formed in-situ. The gaskets may be formed of a suitable non-conductive material which provides an adequate fluidic seal, and which is able to withstand the temperature and chemical environments of the electrochemical cell assembly (and which do not poison the stack of cell units via their degradation). Preferably, the gaskets are compliant (e.g. flexible and compressible) to provide a good seal with, in some cases, a reduced requirement for the compressive force, because a compliant material can easily conform to and seal against surfaces (e.g., surfaces of the respective plates) that vary in parallelism, surface finish, and separation therebetween. The gaskets may be mica gaskets. More preferably, the gaskets are vermiculite gaskets, which are compliant and relatively cheap. The assembly may further comprise an electrically insulating washer surrounding an external end of the electrical stud and contacting an external surface of the base plate or top plate. The washer may be manufactured from mica or a ceramic material. External connection means (e.g. a threaded section) may form part of the external end of the electrical bolt, to connect to a load to the assembly (when operated as a fuel cell) or to supply power to the assembly (when operated as an electrolyser cell). The collar and/or washer may provide mechanical stability to the electrical stud (e.g. during handling of the assembly, or during external connection to the electrical stud) and may prevent ingress of any foreign object to the assembly via the opening.

Preferably, the assembly comprises: at least one positive electrical end plate connected or integrally formed with, and in electrical contact with, a positive electrical stud that extends from a base portion thereof and passes through a first opening in one of the base plate and top plate to form a positive electrical terminal; and, at least one negative electrical end plate connected or integrally formed with, and in electrical contact with, a negative electrical stud that extends from a base portion thereof and passes through a second opening in one of the base plate and top plate to form a negative electrical terminal; and, wherein a fluidic seal is maintained by the compression means between each base portion and the respective one of the base plate and top plate, so as to prevent loss of fluid through each respective opening.

In this preferred case, both positive and negative electrical studs pass through an opening in one or the other of the base plate and top plate.

Preferably, the positive electrical stud passes through the first opening in one of the top plate and the base plate and the negative electrical stud passes through the second opening, this being in the other of the top plate and base plate. In this case the positive and negative electrical studs are positioned to opposite ends of the assembly. In this case, the repeat units may occupy a larger proportion of the volume (in terms of plan area e.g. due to the absence of any busbar) within the assembly (e.g. within the confines of the base plate, top plate and a skirt, or within the confines of a hood of the apparatus) and therefore provide a higher power density.

Alternatively, the positive electrical stud and the negative electrical stud both pass through their respective first and second openings in either the base plate or the top plate. Conveniently, both positive and negative electrical studs are positioned at the same end of the stack, which provides convenient electrical connection and installation of the assembly. In this case, one of the positive and negative electrical studs may be electrically connected to an additional electrical end plate of the same polarity as that stud by a busbar. This provides convenient electrical connection of the assembly. Optionally, the connection to the busbar is via at least one tab that is more flexible than the busbar and the connected electrical end plates. Flexibility of the tab accounts for different thermal expansion between the busbar and the stack of planar cell units. The tab may be manufactured from the same material as the busbar and/or electrical end plates and additional electrical end plate, in which case its flexibility is increased by being thinner than those components. Alternatively, the busbar is more flexible than the tab and the electrical end plates and additional electrical end plate (for example by being thinner) such that the busbar flexes to account for different thermal expansion between the busbar and the stack of planar cell units.

Preferably, the cell units in the stack of planar cell units are provided with at least one port and are stacked one upon another such that the respective ports align to form a respective internal manifold extending through the stack, and wherein the electrical stud extending through its respective opening is also in alignment with the respective internal manifold, such that the compression forces exerted by the compression means to seal the respective internal manifold also act to seal the respective opening. The internal manifold is within the plan view area defined by the cell units. In some cases, the internal manifold may be referred to as a chimney. The internal manifold allows fluid communication between the cell units. An internal volume of each cell unit and the internal manifold may form a first fluid volume. In a fuel cell application, the first fluid volume may be the fuel volume. Two internal manifolds may be provided, a first internal manifold for supply of the first fluid volume and a second internal manifold for exhaust of the first fluid volume. The base plate and/or top plate may be provided with port(s) corresponding to (e.g. aligned with) the port(s) in the cell units, which form part of the internal manifold(s) and allow for supply and/or exhaust of the first fluid volume (i.e. internal manifolding of the first fluid volume). There may be more than one, say, internal inlet manifold, or, indeed, more than one internal outlet manifold.

Preferably, the base portion of the respective electrical end plate extends across the respective internal manifold to block it (i.e. to block the respective internal manifold). The base portion of the electrical end plate may block and fluidically seal the respective internal manifold such that the high compression forces associated with the sealing within the internal manifold is advantageously also employed to provide sealing of the opening. The positive and negative electrical end plates may extend across the plan area of the stack to cover substantially the same plan area as the planar cell units. This allows the electrical end plates to transfer the compression to the stack of planar cell units across the extent of the planar cell units. In other words, the base portion forms a fluidic seal across the opening, and/or across an internal manifold aligned therewith, the fluidic seal being maintained by the compression forces exerted by the compression means.

Preferably, the assembly comprises: first and second respective internal manifolds extending through the stack; and, a negative electrical stud is connected or integrally formed with, and in electrical contact with, the negative electrical end plate and is aligned with the first respective internal manifold; and, a positive electrical stud is connected or integrally formed with, and in electrical contact with, the positive electrical end plate and aligned with the second respective internal manifold. The electrical stud and the opening may be partly or fully aligned (i.e. coaxial) with the respective internal manifold, such that the electrical stud passes through the opening from a region of the electrical end plate that blocks the respective internal manifold. (The width of the actual opening may be larger or smaller than the internal manifold width, but needs to at least overlap it such that the portion of the electrical stud passes through the opening.) When so aligned, maximum transmission of compression occurs and problematic turning forces are avoided; in particular, the electrical stud is preferably coaxial with internal manifold and the respective opening in the one of the base plate and top plate (e.g. the opening in the base and/or top plate may be a continuation of the internal manifold). Where present, the electrically insulating sheet is also provided with respective ports which form a continuation of the respective internal manifold (by being partly or fully aligned (i.e. coaxial) with the respective internal manifold).

Preferably, the negative and positive electrical studs both pass through their respective openings in either the base plate or the top plate, and one of the negative and positive electrical studs is electrically connected to an additional electrical end plate by a busbar. Conveniently, both positive and negative electrical studs are positioned at the same end of the stack, which provides convenient electrical connection and installation of the assembly. In this case, one of the positive and negative electrical studs may be electrically connected to an additional electrical end plate of the same polarity as that stud by a busbar. This provides convenient electrical connection of the assembly. Optionally, the connection to the busbar may again be via at least one tab, and the tab or busbar may be as described above.

In this case, a first fluid volume comprising the first and second internal manifolds may be supplied and exhausted by respective fluid inlet and outlet openings in the other of the base plate and top plate. This provides convenient electrical and fluidic connection of the assembly because both studs pass through openings in one of the base plate and top plate, and both inlet and exhaust for the first fluid volume are located in the other of the base plate and top plate. In an example, one of the positive and negative electrical studs is aligned with one of first fluid volume inlet and exhaust internal manifolds, the other of the positive and negative electrical studs is aligned with the other one of first fluid volume inlet and exhaust internal manifolds.

In this case, the negative and positive electrical studs may both pass through their respective openings in either the base plate or the top plate, and one of the electrical studs may also pass through an opening provided in the electrical end plate that is connected or integrally formed with, and in electrical contact with the other stud. This allows the electrical end plate with the opening through which one of the electrical studs passes to have the same plan view area or extent as the other electrical end plate and the cell units. This means that both manifolds (and their continuations) are formed from the same components and maximum transmission of compression occurs and problematic turning forces are avoided. The opening provided in the electrical end plate through which the stud passes is separated from the stud by an air gap, and may be separated by a collar of insulating material.

In an example, the positive electrical stud and the negative electrical stud may both pass through respective openings in the top plate, wherein the negative electrical stud is directly electrically and mechanically connected to the negative electrical end plate positioned between the positive electrical end plate and the top plate, the additional electrical end plate is positioned between the stack of planar cell units and the base plate, and the additional electrical end plate is electrically and mechanically connected to the negative electrical end plate by the busbar. In this case, the positive electrical end plate may block all of the internal manifolds at that end of the stack (i.e. at the end of the stack proximal to the positive electrical end plate). As a result, the negative electrical end plate is not exposed to the first fluid volume and may be thinner than the positive electrical end plate (if manufactured from the same material) and/or may be manufactured from a different material to the positive electrical end plate. Electrically insulating and fluidically sealing gaskets may be positioned between the negative and positive electrical end plates to provide electrical insulation therebetween and to seal the continuation of the internal manifold. An electrically insulating plate may be positioned between the negative electrical end plate and the positive electrical end plate to improve electrical insulation therebetween. The electrically insulating plate may be manufactured from mica or an electrically insulating ceramic material. Electrically insulating and fluidically sealing gaskets may be positioned between each plate. Negative and positive are used for convenience, the positive electrical end plate may additionally or alternatively be connected to an additional electrical end plate via a busbar in a similar manner.

Preferably, the at least one of the positive and negative electrical end plates separates a first fluid volume and a second fluid volume within the stack. The electrical end plates may seal the first fluid volume, which comprises the volume defined by the internal manifold(s) and the volume between the support plate and separator of each cell unit, from a second fluid volume. Respective internal manifolds may be present for supply and exhaust of a first fluid volume, which may be in fluid communication with an anode of each cell unit. The second fluid volume may comprise the remaining volume within an enclosure defining the assembly (for instance, within and contained by the top plate, base plate, compression means, and the seal around the opening in the base and/or top plate). In operation as a fuel cell, the first fluid volume is typically for fuel and the second fluid volume for oxidant.

Preferably, the compression means comprises a skirt attached in tension between the base plate and the top plate, which skirt encloses at least the stack of planar cell units.

Preferably, the skirt also encloses the positive and negative electrical end plates, and the busbar and additional electrical end plates, where present. The skirt may also be referred to as a hood. Optionally, the skirt forms a gas-tight fluid volume, referred to as the second fluid volume, for example, an oxidant manifolding volume. In this case the skirt is sealingly attached to the base plate and the top plate around the periphery of the base plate and top plate (for example, by means of a gas seal weld). The skirt (compression means), base plate, and top plate are electrically isolated from the stack, which means that the skirt may be manufactured from metal, which allows for simple and convenient attachment of the skirt to the base plate and top plate (for example, by means of a gas seal weld). The electrical isolation means that the skirt is not electrically live which both protects any person carrying out repairs or maintenance on or around an operating fuel cell stack as well as providing simple component earthing in a product.

Preferably, a first fluid flow path, for instance a fuel flow path, from the fuel inlet to the exhaust fuel outlet is internally manifolded, i.e. within the first fluid flow path there is at least one internal manifold or chimney within the stack of planar cell units (for example, providing an inlet chimney or outlet chimney) and that is preferably aligned with the PTO opening such that the sealing provided to the chimney per se is also used to seal the PTO opening. A second fluid flow path, for instance an oxidant flow path, from the oxidant inlet to the exhaust outlet may be externally manifolded, may include in its path at least one section manifolded external to the stack of planar cell units. More preferably, it is manifolded external to the stack of planar cell units, and internal to the electrochemical cell assembly.

More preferably, a volume is defined between the base plate, the top plate, the skirt, and the stack of planar cell units. Such a volume can be considered to be the second fluid manifolding volume.

In some cell assemblies, a second fluid flow path, for instance an oxidant flow path, from the oxidant inlet to the exhaust outlet may be internally manifolded, i.e. within the second fluid flow path there is at least one internal manifold or chimney within the stack of planar cell units (for example, providing an inlet chimney or outlet chimney) and that is preferably aligned with the PTO opening such that the sealing provided to the chimney per se also is used to seal the PTO opening.

Alternative compression means may be used, such as, for example, tie bars within or outside the volume defined by the stack of planar cell units, and these may be used in addition to a skirt which forms a gas-tight fluid volume.

Preferably, an interconnect plate, or a 3D contoured construction formed in the negative electrical end plate, or a 3D contoured construction formed in the additional electrical end plate where present, or a 3D contoured construction formed in an outermost cell unit of the stack of planar cell units provide electrical contact between the respective electrical end plate and the stack of planar cell units for transfer of electrical current therebetween. The interconnect plate or 3D contoured construction provide good electrical contact between plates within the electrochemical cell assembly. The compression means provides compression through the plates, via the interconnect plate or dimples to the stack of planar cell units (and within the stack, between and within each cell unit), thereby ensuring good electrical connection throughout the electrochemical cell assembly.

The 3D contoured construction, for example, comprises a pattern of spaced channels and ribs, or spaced dimples, to control fluid flow.

The assembly according to first aspect detailed above may be combined with any of the features outlined for the alternative first aspect detailed below, and/or with features of the second aspect as detailed below.

In accordance with an alternative first aspect, there is provided an electrochemical cell assembly comprising:

- a base plate and a top plate between which a stack of planar cell units and at least one positive electrical end plate and at least one negative electrical end plate are disposed in compression by means of compression means acting between the base plate and top plate, wherein:
  - at least one electrical end plate is mechanically and electrically connected to, or integrally formed with, an electrical stud extending from a stud base portion,
  - the electrical stud passes through an opening in one of the base plate and top plate to form an electrical terminal,
  - each of the cell units is provided with at least one port and the cell units are stacked one upon another such that the respective ports align to form a respective internal manifold extending through the stack, and,
  - the electrical stud extending through the respective opening is also in alignment with the respective internal manifold, such that the compression forces exerted by the compression means to seal the respective internal manifold also act to seal the opening.

In this way, compression forces exerted by the compression means in the vicinity of the manifold, which forces are necessarily high to seal the respective internal manifold (usually formed of alternating cell units and interleaved manifold (e.g. annular) gaskets), may also be used to seal the opening. The internal manifold may be generally or exactly aligned (i.e. co-axial) with the opening, so that it extends therefrom as a continuing passage.

The assembly according to this alternative first aspect may be combined with any of the features outlined for the first aspect above, and/or with features of the second aspect as detailed below. Hence, the electrical stud may extend from a stud base portion usually forming part of the at least one electrical end plate, or forming part of a further plate connected thereto, which plate is also in compression between the base plate and top plate. The seal may be provided by the stud base portion and may be between the at least one electrical end plate (or further plate) and the respective of the base plate and top plate. Conveniently, the stud base portion extends fully across the internal manifold to block it and may need to be thick enough to withstand dual atmosphere conditions.

In accordance with a second aspect, there is provided an electrochemical cell assembly comprising:—

- a base plate and a top plate between which a stack of planar cell units and at least one electrical end plate are disposed in compression, wherein:
  - the electrical end plate comprises a two-layer construction in which a first layer and a second layer formed of different respective materials are permanently connected together to form a single conductive body,
  - the first layer of the electrical end plate is electrically connected to an external electrical terminal of the cell assembly, and
  - the second layer of the electrical end plate has an outwardly facing side having a first electrically conductive ceramic layer bonded thereto that is in face-to-face abutment with, and in electrical communication with, an adjacent cell unit.

The use of a second layer (or plate) that can be of a different material and different thickness to the first layer (or plate) and that has a ceramic layer bonded thereto has been found to provide a good electrical connection whilst being less prone to delamination of the ceramic layer. The at least one electrical end plate is located between (an end of) the stack of planar cell units and whichever of the base plate and top plate is located at that end of the stack, so as to supply or remove power from the stack via the adjacent cell unit with which it is in electrical communication. Typically, the first and second layers are (formed as individual or separate plates that are) permanently connected by welding, but any suitable connection method may be used to provide a permanent electrical connection between the layers (or plates). Typically the first and second layers are permanently connected around their periphery and around any ports provided through the electrical end plate so as to prevent fluidic communication with a volume between the first and second layers.

Preferably, the adjacent cell unit has a second electrically conductive ceramic layer bonded to the side which is in face-to-face abutment with the first electrically conductive ceramic layer of the electrical end plate, and the first and second electrically conductive ceramic layers are made of the same material.

Forming the first and second electrically conductive ceramic layers from the same material ensures good electrical contact therebetween (e.g., by reduced contact resistance relative to the contact resistance between two dissimilar materials), and therefore also between the electrical end plate and the adjacent cell unit. Efficiency of the assembly, operated as a fuel cell or an electrolyser cell, is thereby improved.

Preferably, the first electrically conductive ceramic layer of the electrical end plate has a thickness selected such that the spacing between the at least one electrical end plate and the adjacent cell unit is the same as the spacing between the remaining cell units of the stack.

In this way, where the cell units of the stack are separated by (e.g. compressible) gaskets, conveniently the same type of gaskets may be used to separate the at least one electrical end plate and the adjacent cell unit (e.g. a gasket of the same material and same thickness). This reduces costs and reduces the number of different materials because the same components are used in multiple locations within the assembly, and ensures consistent transfer of compressive forces through the assembly.

Preferably, the stack comprises electrochemically active cell units, each of which comprise a separator plate and a cell-supporting metal substrate plate.

In an electrochemically active cell unit, the metal substrate plate supports an active electrochemical cell layer (i.e. one in which an electrochemical reaction occurs during operation) bonded thereto, which may be coated, deposited or otherwise affixed thereto. However, at either or both ends of the stack, one or more "dummy" cells that are not electrochemically active may be provided, as described in WO 2015/136295 A1. Hence, the adjacent cell unit may be electrochemically active, meaning it will perform the function of an electrochemical cell at operation conditions. Alternatively, the adjacent cell unit may be electrochemically inactive while still forming an electrical connection between the electrical end plate and rest of the fuel cell stack. For example, it may comprise a separator plate and a metal substrate plate, the latter optionally supporting a layer of cathode material that is the same material as the material used in the cathode of an electrochemically active cell unit.

Typically, the adjacent cell unit comprises at least one of a metal substrate plate and a separator plate. Typically, the cell unit is a metal supported cell unit. A separator plate separates an oxidant fluid volume from a fuel fluid volume in each cell unit of the stack, and will usually be provided with a 3D contoured construction, for example, comprising a pattern of spaced channels and ribs, or spaced dimples, to control fluid flow.

Typically the adjacent cell unit may be arranged such that either of the separator plate or metal substrate plate is in face-to-face abutment with the outermost face of the second layer of the electrical end plate. Typically one or both of the metal substrate plate and the separator plate may be made out of the same material as the second layer of the electrical end plate. Typically this material contains iron, more typically the material is a steel, even more typically a stainless steel, even more typically a ferritic stainless steel. Without being limited by metal type, examples of suitable substrate and/or separator materials include SS441, S5444, Crofer 22.

Typically the separator plate will have a series of raised regions (e.g. a pattern of spaced channels and ribs, or spaced dimples, to control fluid flow) on the side in face-to-face abutment with the electrical end plate. In the case where a second electronically conductive ceramic layer is bonded to the separator plate of the adjacent cell unit, the ceramic layer typically covers these raised regions of the separator plate.

In the case where the metal substrate is in face-to-face abutment with the electrical end plate, the metal substrate may also have a second electrically conductive ceramic layer bonded to the side which is in face-to-face abutment with the first electrically conductive ceramic layer. Typically the first and second ceramic layers will be in electrical contact.

Typically the first ceramic layer will comprise material suitable for use in the cathode of a solid oxide fuel cell. The inventors have found that material suitable for use in the cathode of a solid oxide fuel cell provides good electrical connection between the electrical end plate and the adjacent fuel cell unit. Without being limited by ceramic type, typical examples of suitable materials include LSCF, LCN, BSCF. Typically the second ceramic layer will comprise material suitable for use in the cathode of a solid oxide fuel cell. Even more typically the first and second ceramic layer will have substantially the same composition.

Preferably, the second layer of the electrical end plate is made of the same material as the separator plate. This reduces the number of different materials used in the assembly. It ensures that the second layer of the electrical end plate is chemically compatible with the cell units and the first electrically conductive ceramic layer, and ensures that the second layer of the electrical end plate is compatible with the chemical environment of the assembly (i.e. able to chemically withstand the first and/or second fluid volumes, which may be fuel and oxidant).

Preferably, the second layer of the electrical end plate has essentially the same configuration as the separator plate. Conveniently, the second layer of the electrical end plate is made of the same material as a separator plate of the cell units in the stack of cell units, and preferably, also has essentially the same configuration (e.g., shape and orientation) as a separator plate (except for example, where it requires different (e.g. perimeter) features to perform its function as an electrical end plate), i.e., the second layer is itself a plate (e.g. a self-supporting, rigid plate). In essence, the second layer can therefore be formed from the same separator plate (or very similar component) to the remaining separator plates of the stack, with the advantage that the electrical connection to the adjacent unit cell, and mechanical forces, closely resemble those between adjacent cell units, with the first electrically conductive ceramic layer thus in face-to-face abutment with a metal substrate of the adjacent unit cell, in common with other separator plates in the stack.

Preferably, the second layer of the electrical end plate has a 3D contoured construction with a series of projections extending outwardly so as to abut the adjacent cell unit, over which projections the first electrically conductive ceramic layer extends as a discontinuous layer bonded thereto. The 3D contoured construction may comprise, for example, a pattern of spaced channels and ribs, or spaced dimples, to provide a volume between the electrical end plate and the adjacent cell unit, which allows supply of fluid to the adjacent cell unit and control of the flow of that fluid. The projections abut (e.g. contact) the adjacent cell unit, providing electrical connection between the electrical end plate and the adjacent cell unit, thereby allowing the electrical end plate to transfer electrical power to or from the end of the stack of cell units.

Preferably, the first electrically conductive ceramic layer is made of the same material as a second electrically conductive ceramic layer bonded to a metal substrate plate of the adjacent cell unit that is in face-to-face abutment with the first electrically conductive ceramic layer.

Forming the first and second electrically conductive ceramic layers from the same material ensures good electrical contact therebetween (e.g., by reduced contact resistance relative to the contact resistance between two dissimilar materials), and therefore also between the electrical end plate and the adjacent cell unit. Efficiency of the assembly, operated as a fuel cell or an electrolyser cell, is thereby improved.

In an example, the adjacent cell unit is electrochemically active, and the second electrically conductive ceramic layer comprises an outermost electrode layer of an electrochemically active cell layer bonded to the metal substrate plate of the adjacent cell unit.

In an electrochemically active cell unit, the metal substrate plate supports an active electrochemical cell layer (i.e. one in which an electrochemical reaction occurs during operation) bonded thereto, which may be coated, deposited or otherwise affixed thereto. In an example the outermost electrode layer of an electrochemically active cell layer is a cathode layer. In this case the first electrically conductive ceramic layer comprises a same material as used in the cathode layer.

In an alternative example, the adjacent cell unit is electrochemically inactive, and the second electrically conductive ceramic layer is an electrode material layer that is bonded to the metal substrate plate of the adjacent cell unit. The second electrically conductive ceramic layer is an electrode material layer may be bonded directly to the metal substrate plate of the adjacent cell unit.

One or more electrochemically inactive cells (also referred to as "dummy" cells), that are not electrochemically active may be provided, as described in WO 2015/136295 A1. In this case, the adjacent cell unit may be electrochemically inactive while still forming an electrical connection between the electrical end plate and rest of the fuel cell stack. For example, it may have a metal substrate plate supporting a layer of cathode material that is the same material as the material used in the cathode of an electrochemically active cell unit. The one or more electrochemically inactive cells provide electrical connection between the electrical end plate and electrochemically active cell units in the stack of cell units.

In an alternative to the case where the second layer of the electrical end plate is made of the same material as the separator plate, the second layer of the electrical end plate is made of the same material as the cell-supporting metal substrate plate.

This reduces the number of different materials used in the assembly. It ensures that the second layer of the electrical end plate is chemically compatible with the cell units and the first electrically conductive ceramic layer, and ensures that the second layer of the electrical end plate is compatible with the chemical environment of the assembly (i.e. able to chemically withstand the first and/or second fluid volumes, which may be fuel and oxidant).

In this case, preferably the second layer of the electrical end plate has essentially the same configuration as the cell-supporting metal substrate plate.

Conveniently, the second layer of the electrical end plate is made of the same material as a cell-supporting metal substrate plate of a cell unit in the stack of cell units, and preferably, also has essentially the same configuration as a cell-supporting metal substrate plate (except for example, where it requires different features to perform its function as an electrical end plate), i.e., the second layer is itself a plate (e.g. a self-supporting, rigid plate). In essence, the second layer can therefore be formed from the same cell-supporting metal substrate plate (or very similar component) to the remaining cell-supporting metal substrate plates of the stack, with the advantage that the electrical connection to the adjacent unit cell, and mechanical forces, closely resemble those between adjacent cell units, with the first electrically conductive ceramic layer thus in face-to-face abutment with a separator plate of the adjacent unit cell, in common with other cell-supporting metal substrate plates in the stack.

In this case, preferably the second layer of the electrical end plate has a flat outwardly facing side with the first electrically conductive ceramic layer comprising a continuous layer bonded thereto. The first electrically conductive ceramic layer may be made of the same material as a second electrically conductive ceramic layer bonded to a separator plate of the adjacent cell unit that is in face-to-face abutment with the first electrically conductive ceramic layer.

Forming the first and second electrically conductive ceramic layers from the same material ensures good electrical contact therebetween (e.g., by reduced contact resistance relative to the contact resistance between two dissimilar materials), and therefore also between the electrical end plate and the adjacent cell unit. Efficiency of the assembly, operated as a fuel cell or an electrolyser cell, is thereby improved.

The first electrically conductive ceramic layer may have a thickness equal to the thickness of the electrochemical cell layer of the adjacent cell unit. In this way, where the cell units of the stack are separated by (e.g. compressible) gaskets, conveniently the same type of gaskets may be used to separate the at least one electrical end plate and the adjacent cell unit (e.g. a gasket of the same material and same thickness). This reduces costs and reduces the number of different materials because the same components are used in multiple locations within the assembly, and ensures consistent transfer of compressive forces through the assembly.

The assembly may comprise both a first electrical end plate at one end of the stack where the second layer of the electrical end plate is made of the same material as the separator plate and a second electrical end plate at the other end of the stack where the second layer of the electrical end plate is made of the same material as the cell-supporting metal substrate plate. The first and second electrical end plates provide electrical connection between the stack and the respective electrical terminals.

Preferably, a portion of the external electrical terminal extends through an opening in one of the base plate and top plate to electrically connect to the first layer of the electrical end plate. Optionally, the electrical end plate is as specified in the first aspect above.

For example, the opening(s) may be aligned with internal manifolds (formed by ports through each cell unit in the stack), the electrical terminals (also referred to as electrical studs) may also be aligned with the internal manifolds. Gaskets may separate each plate, and are positioned around ports and openings to form the internal manifold.

Typically the first and second layers of the electrical end plate are iron-containing layers. More typically the layers are steel, more typically stainless steel, even more typically ferritic stainless steel. Without being limited by metal type, examples of suitable materials for the first layer include SS441, Crofer 22 and examples of suitable materials for the second layer include SS441, SS444, and Crofer 22.

Typically, the first layer of the electrical end plate will have a thickness of at least 0.5 mm, more typically between 0.5 mm and 5 mm, even more typically between 0.5 and 2 mm, even more typically between 1 and 2 mm. In other words, the first layer of the electrical end plate is itself a plate, which may also be referred to as a self-supporting rigid plate.

Typically, the thickness of the first and second ceramic layers is 50-200 micrometers, preferably 80-150 micrometers, and more preferably 90-100 micrometers.

Typically, the thickness of the substrate (also referred to as support plate, metal substrate plate or cell-supporting metal substrate plate) is 50-250 micrometers, preferably 50-150 micrometers, and more preferably 100 micrometers.

Preferably the electrochemical cells of any of the aspects detailed above comprise planar, solid oxide, fuel cell or electrolyser cell units. The electrochemical cell assembly may be used as a fuel and/or electrolyser cell or any other variant capable of electrochemistry. The stack of planar cell units may be based on one of solid oxide electrolytes, polymer electrolyte membranes, or molten electrolytes or any other variant capable of electrochemistry. In an example, the electrochemical cell is based on a plurality of planar cell units (e.g. tens to several hundred cell units) having solid oxide electrolytes and so the electrochemical cell may be referred to as a solid oxide fuel cell (SOFC) and solid oxide electrolyser cell. The solid oxide electrolytes may be supported by a foil, in which case they may be referred to as metal-supported cells, in particular, metal-supported solid oxide fuel cell (MS-SOFC) or electrolyser cell.

The stack may comprise electrochemically active cell units, each of which comprise a separator plate and a cell-supporting metal substrate plate. In an electrochemically active cell unit, the metal substrate plate supports an active electrochemical cell layer (i.e. one in which an electrochemical reaction occurs during operation) bonded thereto, which may be coated, deposited or otherwise affixed thereto. However, at either or both ends of the stack, one or more "dummy" cells that are not electrochemically active may be provided, as described in WO 2015/136295 A1. Hence, a cell unit adjacent an electrical end plate may be electrochemically active, meaning it will perform the function of an electrochemical cell at operation conditions, and the electrical end plates may be in contact with a respective electrochemically active cell unit at the end of the stack of cell units. Alternatively, the adjacent cell unit may be electrochemically inactive while still forming an electrical connection between the electrical end plate and rest of the fuel cell stack. For example, it may have a metal substrate plate supporting a layer of cathode material that is the same material as the material used in the cathode of an electrochemically active cell unit. In either case, the electrical end plate may be described as being in electrical contact with an adjacent cell unit positioned at the end of the stack.

Typically, the adjacent cell unit comprises at least one of a metal substrate plate and a separator plate. Typically, the cell unit is a metal supported cell unit. A separator plate separates an oxidant fluid volume from a fuel fluid volume in each cell unit of the stack, and will usually be provided with a 3D contoured construction, for example, comprising a pattern of spaced channels and ribs, or spaced dimples, to control fluid flow.

As indicated above, "cell units" or "cell stack" is used to refer to "electrochemical cell units" or "electrochemical cell stack".

BRIEF DESCRIPTION OF THE DRAWINGS

FIG. 5A is a cross sectional view of a cell stack arrangement in accordance with the first aspect and FIG. 58 is an enlarged view of a portion of the cell stack arrangement of FIG. 5A.

In the following figures and description like reference numerals will be used for like elements in different figures.

DETAILED DESCRIPTION OF 1ST ASPECT

Figure 1:
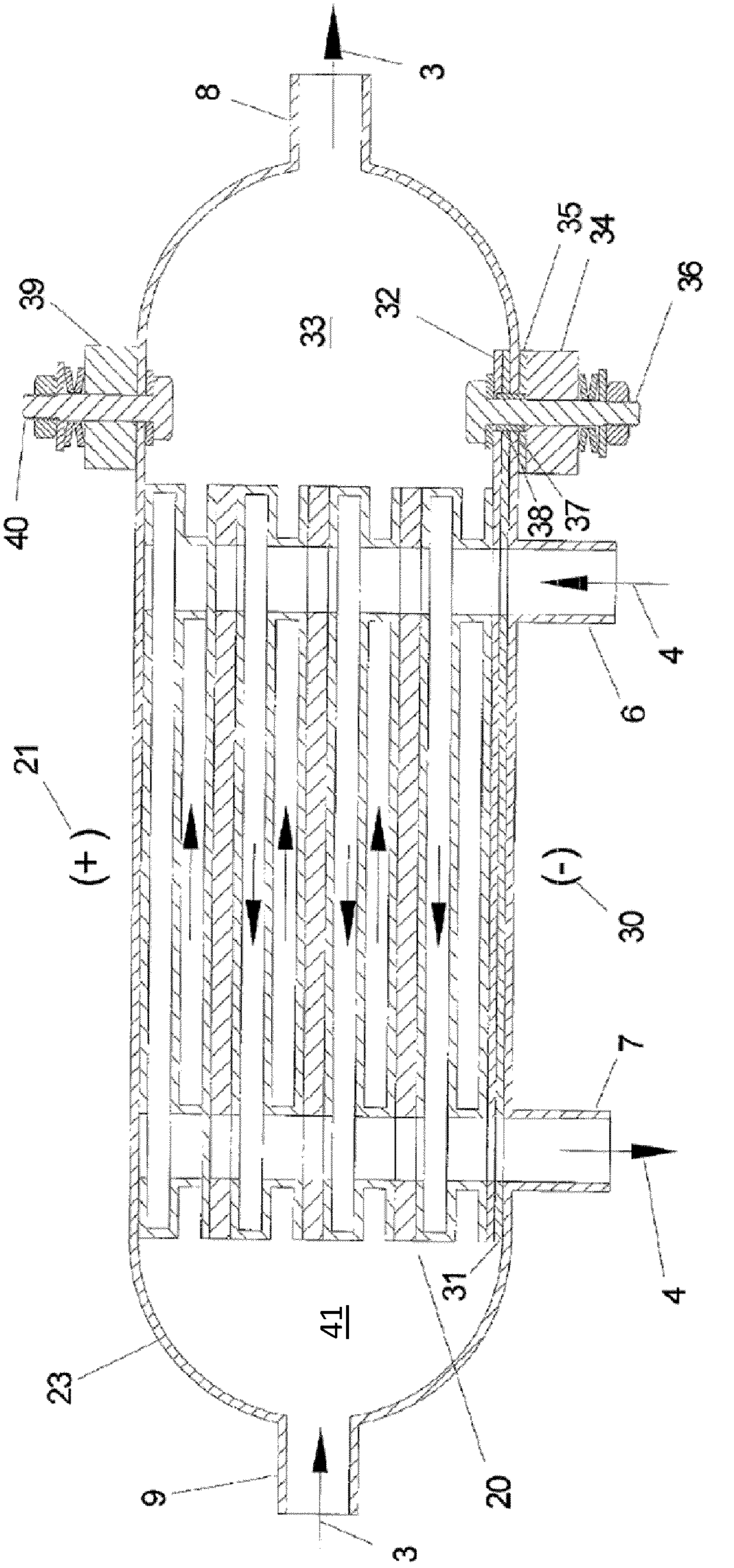
FIGS. 1 and 2 are schematics of prior art cell stack arrangements.
Figure 2:
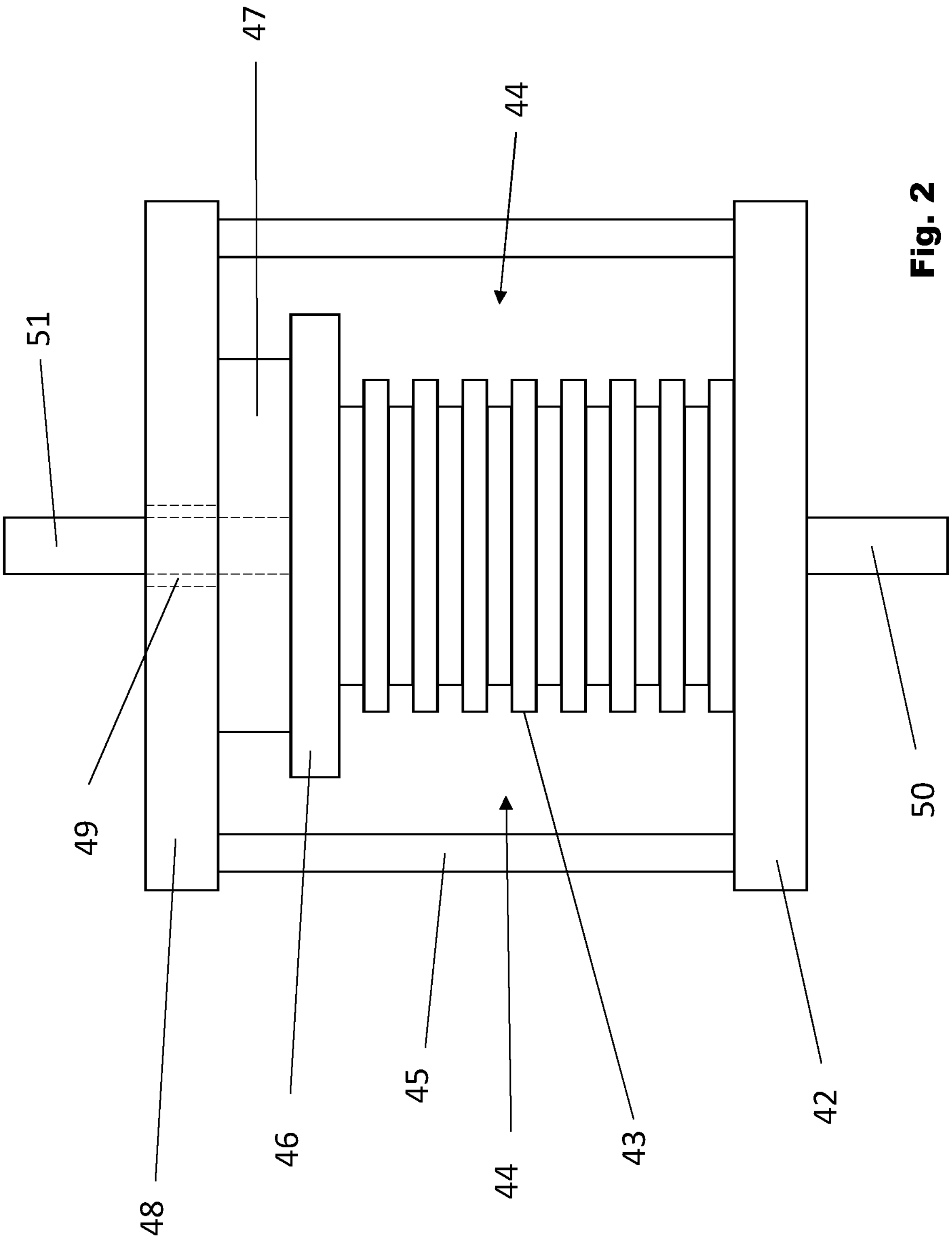
Figure 3:
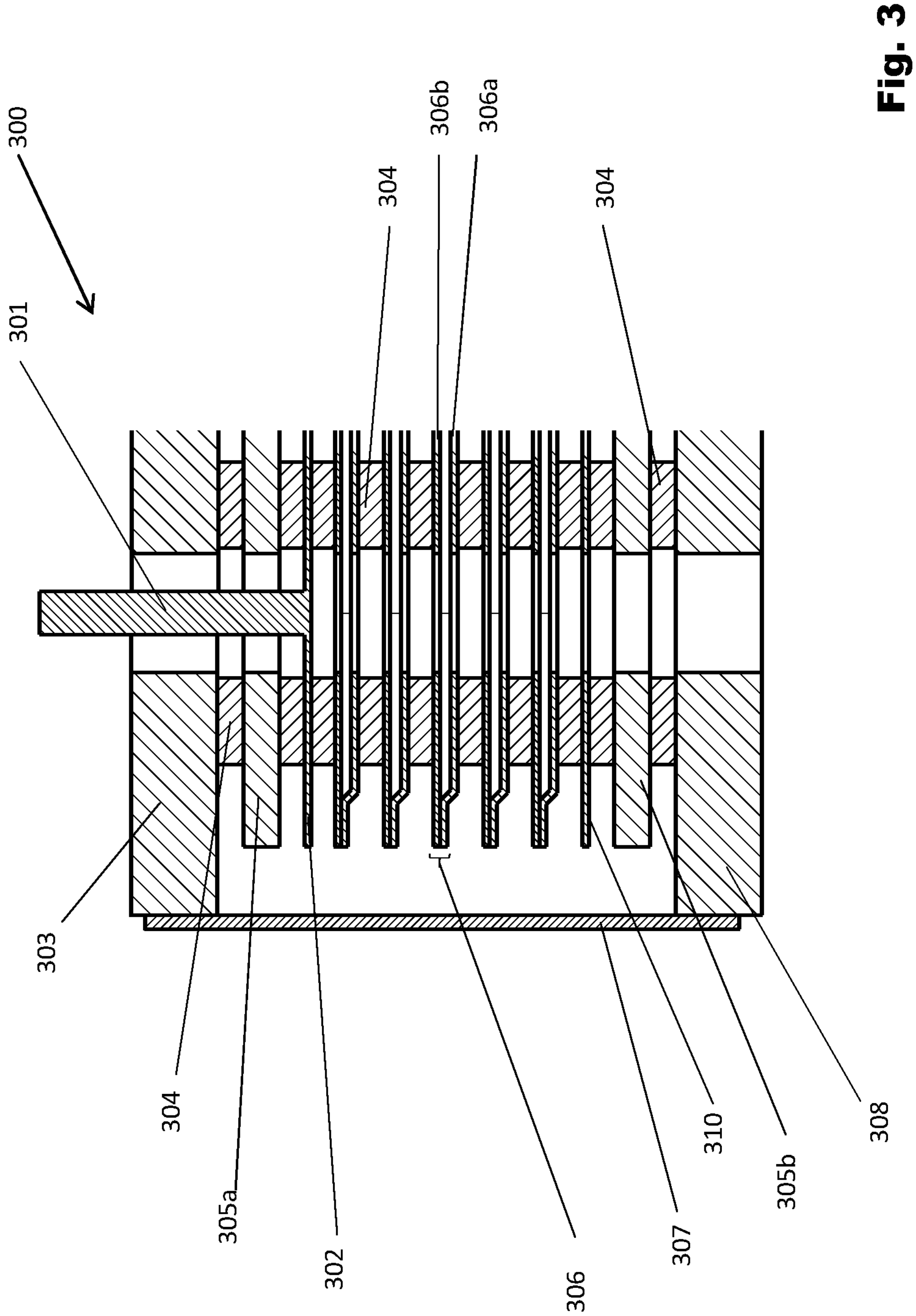
FIG. 3 is a cross sectional view of a cell stack arrangement in accordance with a first aspect of the present invention.

Referring to FIG. 3, a cross sectional view of an electrochemical cell stack arrangement 300 is shown, the cross section is truncated at the right-hand side so as to show detail of an internal manifold (chimney), an electrical stud, and an electrical end plate. A stack of five repeating cell units 306 are shown forming the electrochemical cell stack, the number of cell units is reduced for illustrative purposes and is typically much larger (for example 30-200). The cell units 306 comprise a substrate (or metal support plate) **306*a* and a separator (or interconnect) 306*b* and may be similar to those described in the Applicant's earlier patent application WO 2015/136295. The substrate 306*a* carries an electrochemically active layer (or active fuel cell component layer, not shown) comprising respective anode, electrolyte and cathode layers respectively deposited (e.g. as thin coatings/films) on and supported by the metal support plate (e.g. steel plate or foil), the electrochemically active layer faces the separator 306*b* of the adjacent cell unit 306. The metal support plate 306*a* has a porous region (not shown) surrounded by a non-porous region with the active layers being deposited upon the porous region so that gases may pass through the pores from one side of the metal support plate 306*a* to the opposite side to access the active layers coated thereon. As shown in FIG. 3, each cell unit 306 comprises two plates or layers—the metal support plate 306*a* and a separator plate 306*b* (but a spacer plate may be sandwiched between the metal support plate 306*a* and the separator plate 306*b*). It also has fluid ports that are provided in the plates (for oxidant and/or fuel) and the plates are stacked upon one another and welded (fused together) to form a single metal-supported repeat cell unit 306 with a fluid volume in the middle defined by the space provided in between the metal support plate 306***a* and the separator plate 306*b*. The metal components of the fuel cell stack repeat layer 306 are in electrical contact with one another, with electron flow between them being primarily via the fuse/weld path, thereby avoiding surface-to-surface contact resistance losses.

As discussed in WO2015/136295, the porous region comprises small apertures (holes drilled through the metal foil substrate) (not shown) extending through the metal support plate 306*a*, in a location to overlie the anode (or cathode, depending on the polarity orientation of the electrochemically active layer), which is positioned under the metal support plate 306*a*. These are positioned in the large space or aperture between the metal support plate 306*a* and the separator plate 306*b* (and which may be defined by the spacer plate) so as to allow the fluid volume to be in fluid communication with the electrochemically active layers on the underside of the support plate 306*a* through the small apertures.

In the separator plate 306*b*, up and down corrugations are provided to extend up to the cathode (or anode, depending on the polarity orientation of the electrochemically active layers) of a subsequent (or neighboring) fuel cell unit stacked onto this fuel cell unit, and down to the metal support plate 306*a* of its own fuel cell unit 306. This thus electrically connects between adjacent fuel cells units 306 of a stack to put the electrochemically active layers of the stack (usually one on each fuel cell unit) in series with one another.

The stack of cell units 306 in FIG. 3 are stacked with gaskets 304 positioned between neighboring cell units 306. Each gasket 304 surrounds a fluid port of the cell unit and is electrically insulating. The stack of cell units 306, with respective gaskets 304, are positioned one atop another such that corresponding fluid ports in the cell units 306 are aligned to form an internal manifold or chimney through the stack of cell units, through which a fluid may be delivered to, and exhausted from, the cell units (specifically, to the opening between the metal support plate 306*a* and the separator plate 306*b* of each cell unit 306). The gaskets 304 provide a fluidic seal between their surface and that of the abutting surface. The gaskets 304 are preformed gaskets and are not electrically conductive. The gaskets may, for example, be made of a vermiculite (e.g. thermiculite), which may provide a superior sealing performance compared to mica or ceramic while requiring much lower load to seal.

Either or both of the metal support plate 306*a* and the separator plate 306*b* of a cell unit 306 may be provided with dimples (not shown in FIG. 3) or other 3D protrusions protruding toward and contacting the other of the metal support plate 306*a* and the separator plate 306*b* in a region surrounding the fluid port (i.e. surrounding the chimney) and in line with the gaskets 304. The dimples transfer compression through the stack of cell units, supporting compression applied to the cell unit by the gaskets (port gaskets, that is gaskets surrounding a port, the gaskets are typically annular surrounding a port of circular cross-section) 304 positioned above and below the cell unit, and maintain a separation (gap) between the metal support plate 306*a* and the separator plate 306*b* of a single cell unit 306. The dimples may be arranged in rings around the port, and allow a first fluid to enter or exit the gap between the metal support plate 306*a* and the separator plate 306*b* of a cell unit 306 (as described further with respect to FIGS. 5 and 6).

In this embodiment, positioned to each end of the stack of cell units are a power take off assembly and a top plate or baseplate. A power take off assembly comprising a first electrical end plate 302 and an electrical stud 301 is positioned to the upper end of the stack of cell units, with the first electrical end plate 302 positioned atop the stack of cell units. The first electrical end plate 302 is separated from the end of the stack by a (port) gasket 304, which is identical to the (port) gaskets used between cell units 306 in the stack. The first electrical end plate 302 blocks the chimney, by means of a base portion from which the electrical stud extends perpendicularly, such that fluid may not pass the first electrical end plate 302, as discussed further below. The first electrical end plate 302 is in electrical contact with the cell unit 306 at the upper end of the stack of cell units 306. The first electrical end plate 302 transfers electrical potential from the cell unit 306 at the upper end of the stack of cell units 306 to the electrical stud 301, which transfers the potential external to the cell stack arrangement 300, the stud acting as an electrical terminal. The first electrical end plate 302 and electrical stud 301 may be unitary; alternatively they may be two separate components which are welded, brazed, screwed, or otherwise affixed to one another.

Positioned above (i.e. outwardly of) the first electrical end plate 302 is a first electrically insulating plate 305*a*, so that the first electrical end plate 302 is positioned between the first electrically insulating plate 305*a* and the stack of cell units. The first electrically insulating plate 305*a* extends preferably across the stack to at least the same extent as the underlying stacked cell units and is separated from the first electrical end plate 302 by a (port) gasket 304, which is identical to the gaskets used between cell units 306 in the stack. The gasket 304 surrounds an opening in the first electrically insulating plate 305*a* which is coaxial with (and forms a continuation of) the chimney for internal manifold) through the stack, through which the electrical stud 301 needs to pass.

Positioned above the first electrically insulating plate 305*a* is a top plate 303, so that the first electrically insulating plate 305*a* is positioned between the top plate 303 and the first electrical end plate 302. The first electrically insulating plate 305*a* is separated from the top plate 303 by a (port) gasket 304, which is identical to the gaskets used between cell units 306 in the stack. The gasket 304 surrounds an opening in the top plate 303 which is coaxial with (and forms a continuation of) the chimney through the stack, through which the electrical stud 301 passes. The first electrically insulating plate 305*a* provides electrical insulation between the electrical end plate 302 and the top plate 303. The first electrically insulating plate 305*a* may be manufactured from mica or a non-conductive ceramic material.

Positioned below the stack of cell units (i.e. to the opposite end of the stack than that having the first electrical end plate 302, first electrically insulating plate 305*a*, and top plate 303) is a second electrical end plate 310, second electrically insulating plate 305*b*, and base plate 308. The second electrical end plate 310 is separated from the end of the stack by a gasket 304, which is identical to the (port) gaskets used between cell units 306 in the stack. The second electrical end plate 310 is provided with a port, which is aligned with the ports through the cell units 306, through which fluid may pass, as such, it defines part of the chimney. The second electrical end plate 310 is in electrical contact with the cell unit 306 at the lower end of the stack of cell units 306, and has opposite polarity to the first electrical end plate. The second electrical end plate 310 may be in electrical contact with a second electrical stud (not shown) to transfer electrical energy out of the cell stack arrangement 300.

Positioned below the second electrical end plate 310 is the second electrically insulating plate 305*b*, so that the second electrical end plate 310 is positioned between the second electrically insulating plate 305*b* and the stack of cell units. The second electrically insulating plate 305*b* is separated from the second electrical end plate 310 by a gasket 304, which is identical to the gaskets used between cell units 306 in the stack. The gasket 304 surrounds an opening in the second electrically insulating plate 305*b* which is coaxial with (and forms part of) the chimney through the stack, through which fluid may pass.

Positioned below the second electrically insulating plate 305*b* is the base plate 308, so that the second electrically insulating plate 305*b* is positioned between the base plate 308 and the second electrical end plate 310. The base plate 308 is separated from the second electrically insulating plate 305*b* by a gasket 304, which is identical to the gaskets used between cell units 306 in the stack. The gasket 304 surrounds an opening in the base plate 308 which is coaxial with (and forms part of) the chimney through the stack, through which fluid may pass, and provides a port for fluid delivery to or exhaust from the chimney and thereby the stack. The second electrically insulating plate 305*b*, which is similar to the first electrically insulating plate 305*a*, provides electrical insulation between the electrical end plate 310 and the base plate 308. The second electrically insulating plate 305*b* may be manufactured from mica or a non-conductive ceramic material.

Compression means 307 is provided to maintain a compression which was applied during manufacture. The compression means 307 is provided between the base plate 308 and top plate 303 and maintains a compression in components therebetween (i.e. gaskets 304, electrically insulating plates 305*a*, 305*b*, first and second electrical end plates 302, 310, and cell units 306). The compression means 307 of FIG. 3 is shown as a skirt which may be welded or otherwise permanently attached to the base plate 308 and top plate 303 while an external compression is applied between the same during manufacture. Once the external compression force is removed, a tensile force through the skirt maintains the compressive load in the stack, via the base plate 308 and top plate 303. The weld path may encircle the base plate 308 and top plate 303 and form a fluid seal to fluidically seal a (fluid) volume defined by the base plate 308, top plate 303, and skirt 307 containing the stack. The base plate 308 and top plate 303 are relatively stiff plates (stiffer than any of the other plates in the arrangement, e.g. the metal support plate, separator plate, cell unit as a whole, and the electrical end plates, and is stiffer for example by being thicker, rather than necessarily by being made of an intrinsically stiffer material), which spread the compression load over the plan area of the stack (at least over the area where they contact the gaskets 304 and the area in line with the electrochemically active layers). The compression means maintains the compressive force which provides good electrical contact between repeat units (including cell units) in the stack. The compression means also maintains compression in seals, e.g. (port) gaskets 304, to seal the chimney, and maintains structural integrity in the stack, as described in Applicant's earlier patent application WO 2019/002829A. As a result, a first fluid volume is defined in the chimney and the space between the metal support plate 306*a* and separator 306*b* of each cell unit 306. A second fluid volume, fluidically sealed from the first fluid volume, is defined by the remaining volume within the volume defined by the base plate 308, top plate 303, and skirt (compression means) 307. Thus, in this case, the compression means fulfils a further purpose of defining and sealing a fluid volume (i.e. the second fluid volume). The first fluid volume may be in fluid communication with the anode of an electrochemically active layer, and the second fluid volume may be in fluid communication with the cathode of an electrochemically active layer, or vice versa depending on how the electrochemical cell layers are laid up.

As an alternative, the compression means 307 may comprise tie bars arranged to pass through (secured with securing means, e.g. locking nuts) or screw into openings and connect the base plate 308 and top plate 303, and which maintain compression force applied to the cell stack arrangement between the base plate 308 and top plate 303. In this case, the compression means do not define and seal a fluid volume, rather the second fluid volume may be contained by a vessel in which the arrangement 300 is positioned.

In an example, the first electrical end plate 302 is in electrical contact with an outermost layer (e.g. an anode layer) of the uppermost cell unit 306 of the stack of cell units and the second electrical end plate 310 is in electrical contact with a cathode layer of the lowermost cell unit 306 of the stack of cell units (the stacked cell units being in a series connection). The anode may be in fluid communication with the first fluid volume and the cathode in contact with the second fluid volume. Operated as a fuel cell, fuel is supplied to the first fluid volume and oxidant supplied to the second fluid volume, and a potential difference is produced between the first electrical end plate 302 and the second electrical end plate 310, and a load may be connected therebetween. In this case, the first electrical end plate 302 may be referred to as a monopole and the second electrical end plate 310 may be referred to as an end pole.

Operated as an electrolyser cell, a potential difference is applied between the first electrical end plate 302 and the second electrical end plate 310 to drive the production of hydrogen gas and/or carbon monoxide and oxygen.

Figure 4:
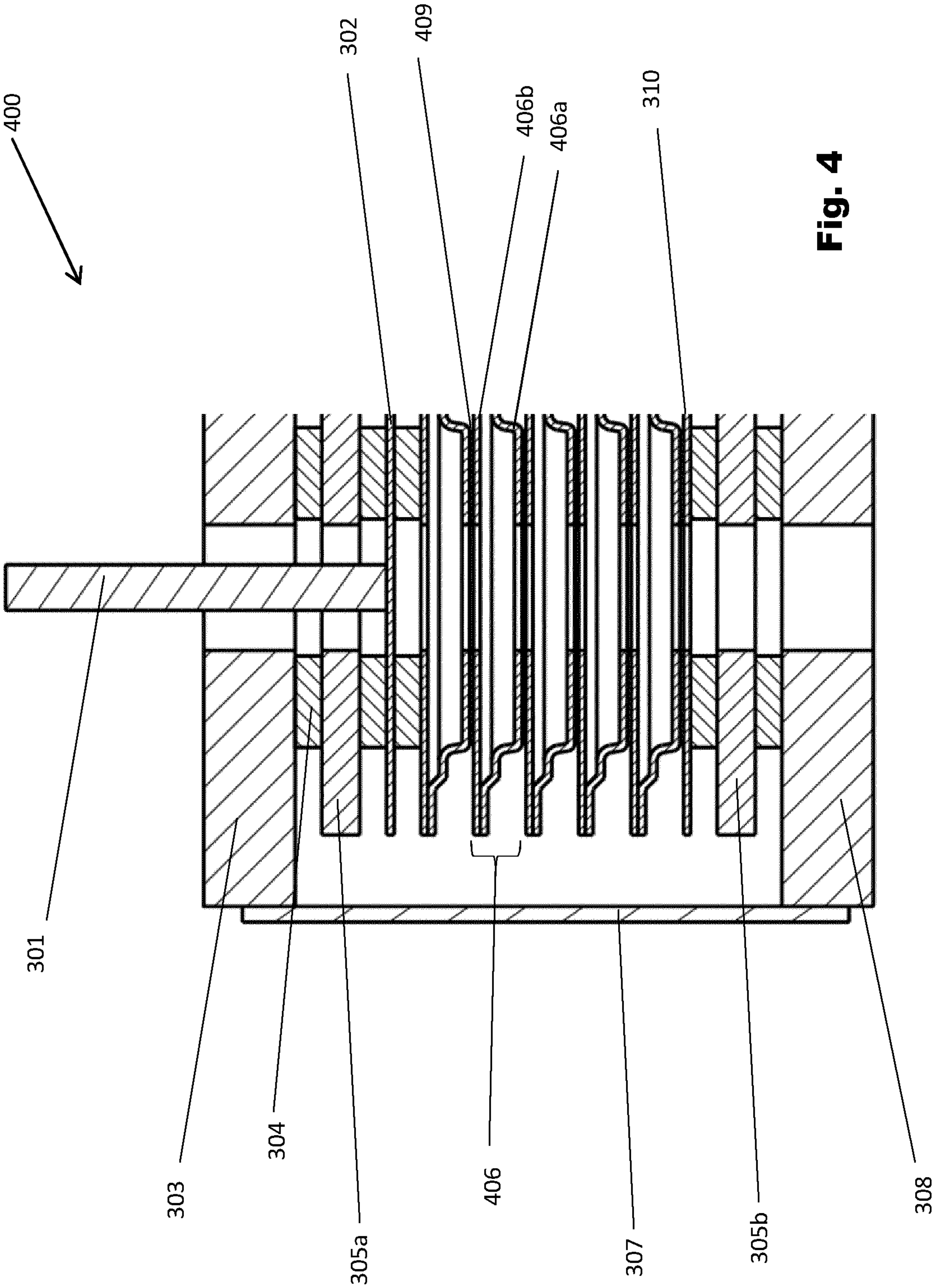
FIG. 4 is a cross sectional view of a cell stack arrangement in accordance with the first aspect.

Referring to FIG. 4, a cross sectional view of a cell stack arrangement 400 is shown. Cell stack arrangement 400 is a variant of the cell stack arrangement 300 of FIG. 3. In the variant shown in FIG. 4, the cell unit (repeat unit) 406 includes a metal support plate 406*a* and a separator plate 406*b*. In this variant, no preformed (port) gaskets are required between cell units 406 in the stack of cell units. Instead of a (preformed) gasket, an annulus surrounding the fluid port of the metal support plate 406*a* is raised (downwards in the figure) by forming the annulus to protrude away from the separator plate 406*b* of that cell unit and toward the separator plate of the neighboring cell unit.

An in-situ seal, namely, a ring of sealant material 409 is formed on the annulus, and this material may be applied during assembly of the stack. It can be any conventional sealant material designed when hardened to withstand the operational environment of the fuel cell. It could also be replaced with a (pre-formed) gasket if needed, but the use of an in-situ seal has the significant advantage of reducing the parts count, reducing costs and simplifying assembly since the careful positioning of gaskets is no longer required.

With this arrangement, the thickness of the sealant material can be significantly less than is generally needed for a pre-formed gasket. An electrically insulating seal or in-situ seal may be used on one or both of the abutting surfaces (which form a hard stop surface, e.g. formed by the raised annulus and separator plate of the adjacent fuel cell unit) of adjacent fuel cell units to prevent electrical contact between adjacent fuel cell units via the abutting surfaces.

An annular groove (not shown, for clarity) may also be provided in the annulus, the annular groove protruding toward the separator plate 406*b* of that cell unit, for accommodating the insitu seal material. The annular groove may form a uniform circle in this, with a constant depth, however it would be possible to make the groove less uniform both in radius and depth, but for simplicity a uniform radius and depth is provided. The annular groove accommodates a volume (or bead) of the sealant material, and contacts the separator plate 306*b* of an adjacent cell unit 306, thus it functions like the gaskets 304 of FIG. 3.

The thickness of the gasket 304 of FIG. 3 helped provide a space between adjacent fuel cell units for air or fuel flow. To retain that space, shaped port features can be provided in the annular portion of the metal support plate 406*a*. This also ensures that the final height of the top of the gasket seal material still is the correct height to allow the outer surface of the electrochemically active layers to correctly contact the separator plate 406*b* of the adjacent cell unit 406.

The raised annulus is shown in FIG. 4 as part of the metal support plate 406*a*, but may alternatively be provided in the separator plate 406*b* of each cell unit 406.

As now exemplified in the embodiment that follows, any or all of the shaped features and shaped perimeter flange (through which the cell units are welded as a two piece cell) provided, as described in the arrangements of FIGS. 3 and 4, in the metal support plate 406*a*, could instead be provided in the separator plate 406*b*.

Figure 5A:
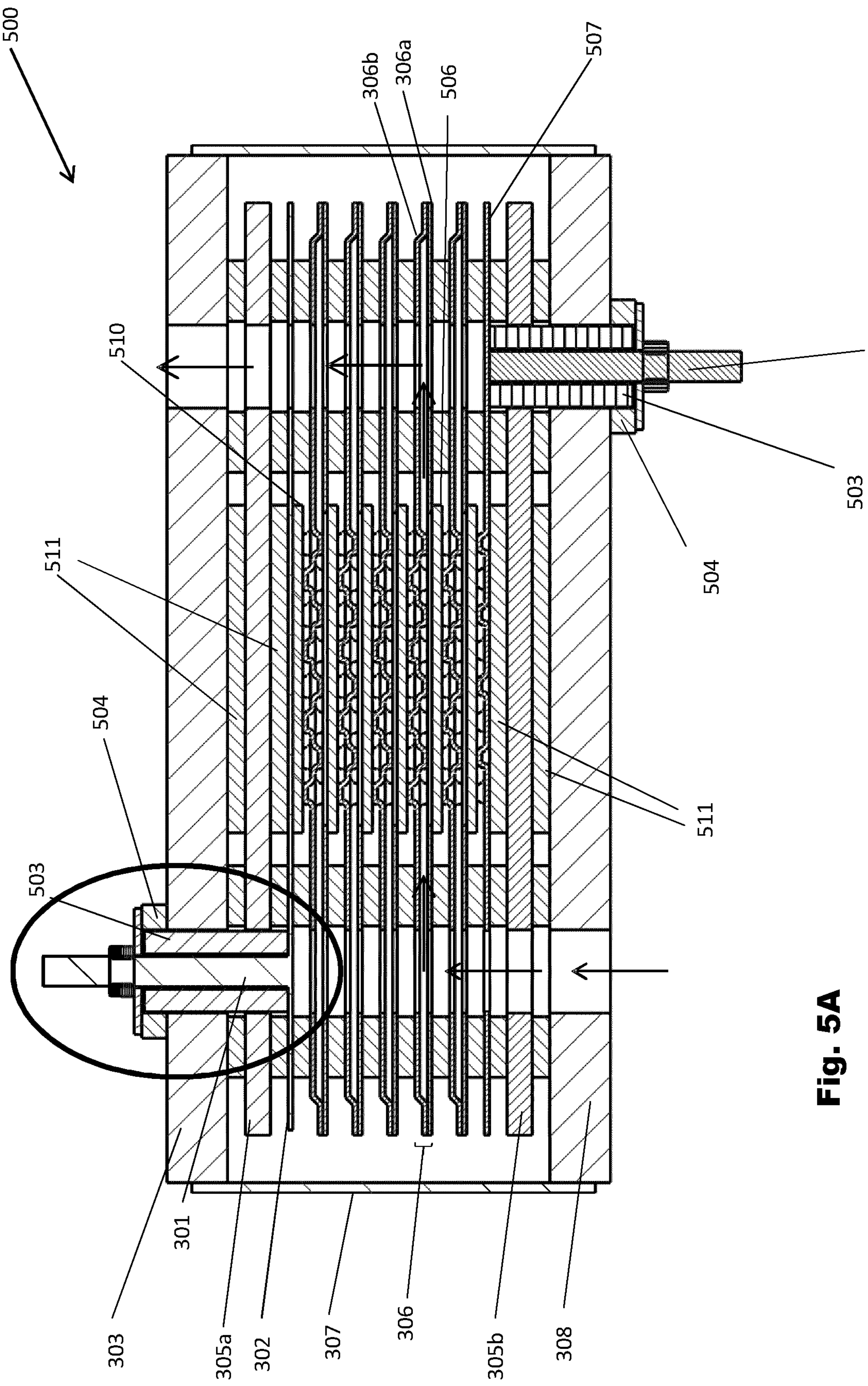
Figure 5B:
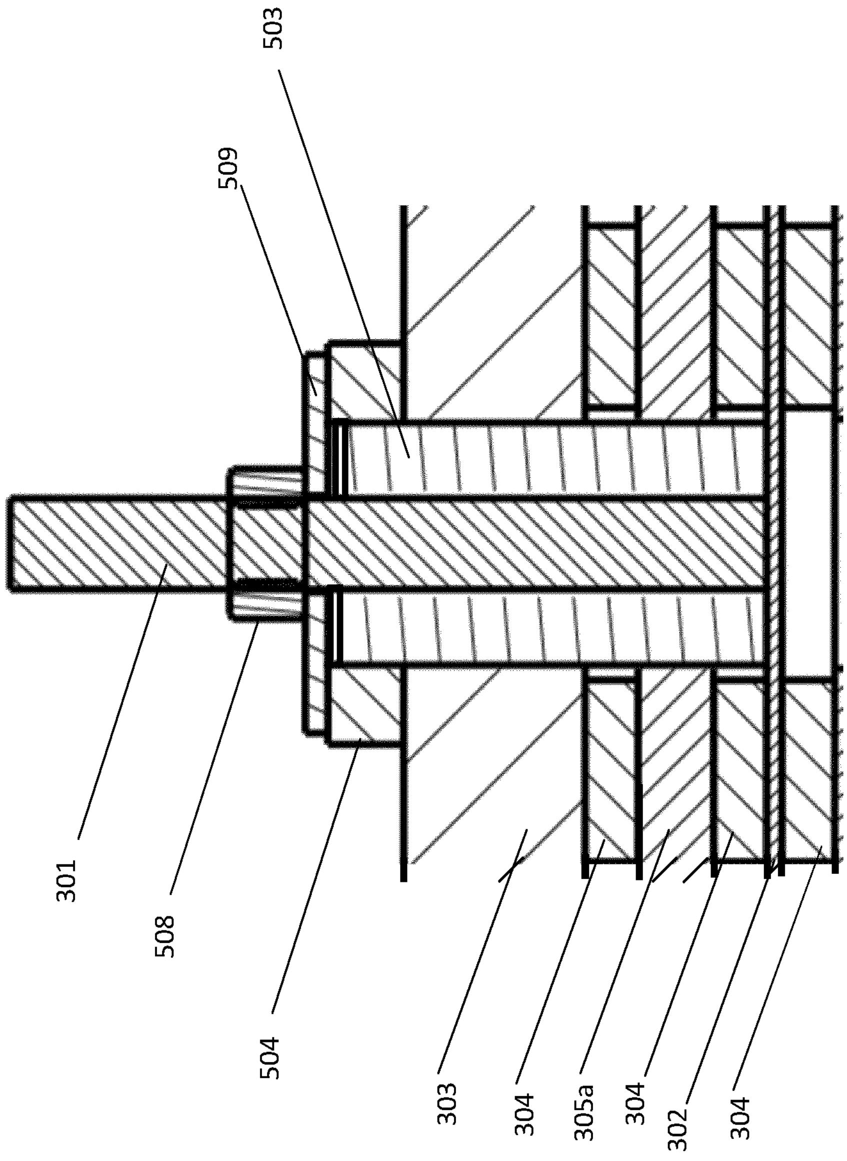
Figure 8:
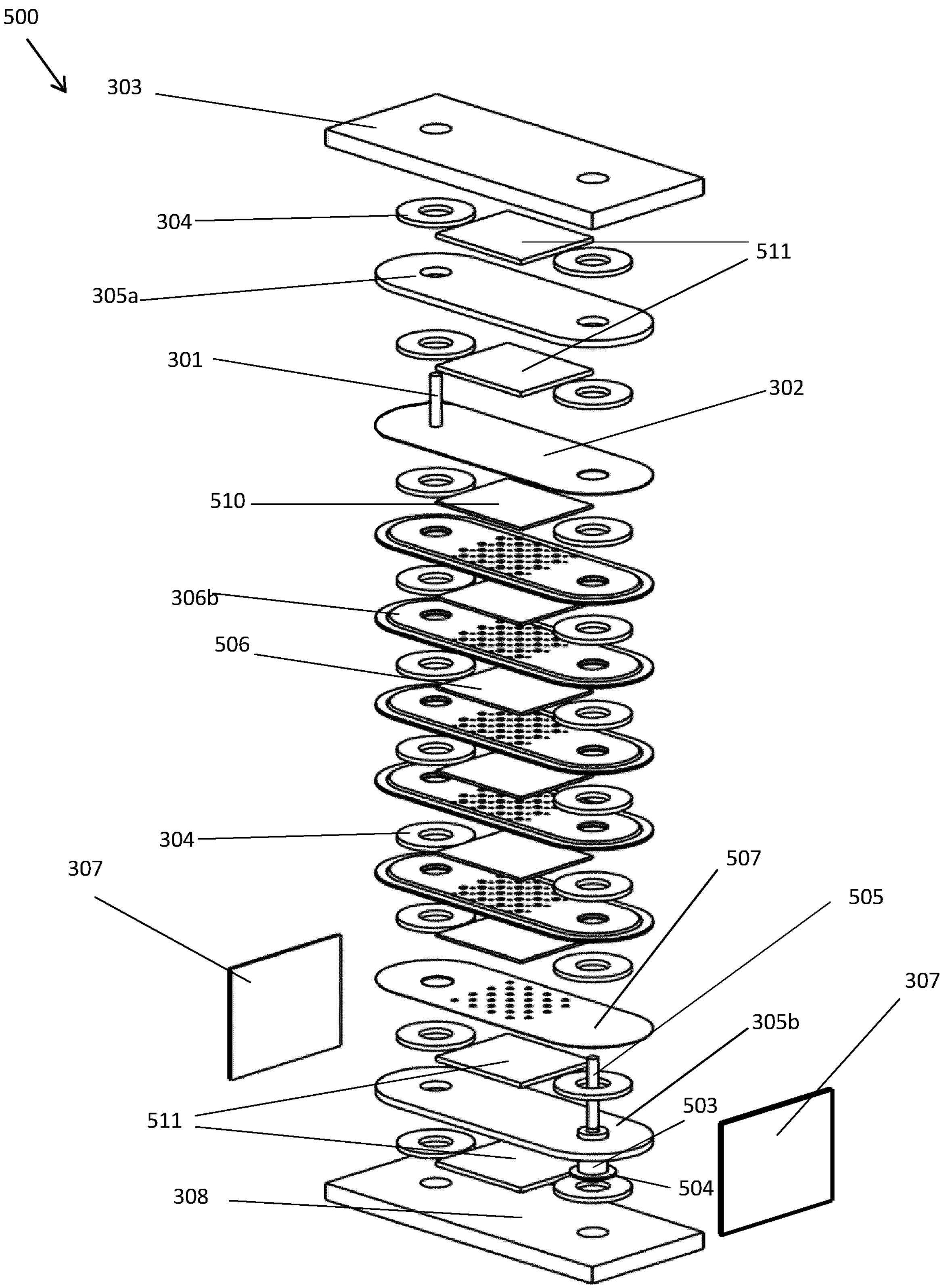
FIG. 8 is an exploded perspective view of the cell stack arrangement shown in FIG. 5A in accordance with the first aspect.

Referring to FIG. 5A, a cross sectional view of a cell stack arrangement 500 is shown, and referring to FIG. 5B an enlarged view of the area encircled in FIG. 5A is shown. FIG. 8 is an exploded perspective view of the arrangement 500 of FIG. 5.

Cell stack arrangement 500 comprises a stack of cell units 306 similar to the cell units 306 described above. FIG. 5A shows the electrochemically active layer 506, comprising respective anode, electrolyte and cathode layers respectively deposited (e.g. as thin coatings/films) on and supported by the metal support plate 306*a*. FIG. 5A also shows the up and down projections of the separator plate 306*b* which contact the metal support plate 306*a* of the cell unit 306 and an outermost layer of the electrochemically active layer 506 of the adjacent (neighboring) cell unit 306.

The electrical stud 301 and first electrical end plate 302 are similar to those described above. In this case an electrically insulating sleeve 503 (also referred to as a collar) surrounds the electrical stud 301. The electrical stud 301 and the openings through the first electrically insulating plate 305*a* and top plate 303 may be circular in cross section, and in which case the sleeve 503 is a hollow cylinder. The sleeve 503 is formed from an (electrically) insulating material, such as mica or ceramic. It provides mechanical stability to the electrical stud 301 during handling of the stack arrangement 500 and during connection of a load to the stud 301. The sleeve 503 also prevents ingress of foreign material (e.g. dirt) into the stack arrangement 500 via the opening in the top plate 303. Further mechanical stability is provided by a washer 504 which surrounds the sleeve 503 (and stud 301) and sits on the outer face of the top plate 303. The outer face of the washer 504 sits proud (i.e. protrudes from the outer face of the top plate 303 further than) the outer end of the sleeve 503 such that any mechanical forces applied to the stud are transferred through the washer 504 to the top plate 303 rather than through the sleeve 503 or through the stud 301 to the first electrical end plate 302. The washer may be formed of any suitable (electrically) insulating material, such as ceramic or mica. As seen in FIG. 5*b*, a busbar 509 may be affixed to the stud 301, external to the stack arrangement 500 and contacting the washer 504, by a nut 508.

Further details of the first electrical end plate 302 are apparent in FIG. 5A. The first electrical end plate 302 is (preferably) provided with a layer of material 510 deposited (e.g. as thin coatings/films) on—or attached to—and supported by the first electrical end plate 302. The layer of material 510 is an electrically conductive ceramic material, and may have a similar composition to that of the cathode of the electrochemically active layer 506, for example it may be LSCF, LCN, BSCF, eg LCN60. The layer of material 510 advantageously has a thickness which is equivalent to the thickness of the electrochemically active layer 506 of the cell units 306, which means that the protrusions in the separator plate 306*b* of the outermost (uppermost in FIG. 5A) cell unit 306 contact the face of the layer of material 510. This conveniently also allows all gaskets 304 to be of similar thickness. This reduces the number of different components required in the stack arrangement 500 as no special components are required to connect the stack of cell units 306 to the first electrical end plate 302. The layer of material 510 contacts the (up) protrusions in the separator plate 306*b* of the outermost (uppermost in FIG. 5A) cell unit in the stack of cell units and electrically connects that separator plate to the first electrical end plate 302 to allow transfer electrical energy therebetween. The electrical end plate 302 is shown as a single plate upon which the layer of material 510 is affixed, coated, or deposited, but may also be a two (or more) part construction, as described in the second aspect, for example electrical end plate 1402 of FIG. 10.

A second electrical stud 505 is shown in FIG. 5A, which is similar to the electrical stud 301 described above but has opposite polarity. The second electrical stud 505 is connected to the second electrical end plate 507, and passes through openings in the second electrically insulating plate 305*b* and base plate 308. The second electrical stud 505 is provided with a sleeve 503, washer 504, busbar, and nut, similar to the first electrical stud 301, but associated with the base plate 308 rather than the top plate 303.

Further details of the second electrical end plate 507 are apparent in FIG. 5A. The second electrical end plate 507 is provided with protrusions extending toward the stack of cell units to contact an outermost electrode (e.g. the cathode) of the electrochemically active layer 506 of the outermost (lowermost in FIG. 5A) cell unit 306 of the stack of cell units. The protrusions have the same height as those in the separator plates 306*b* which protrude (up) towards the electrochemically active layer 506 of an adjacent cell unit 306. This advantageously allows the gaskets 304 positioned between the second electrical end plate 507 and the stack of cell units to be of the same thickness (indeed, to be the same gaskets) as those used between adjacent cell units 306 in the stack of cell units.

The protrusions in the second electrical end plate 507 contact the outermost (lowermost in FIG. 5A) face of the electrochemically active layer (e.g. the cathode) of the outermost cell unit in the stack of cell units and electrically connects that face of that electrochemically active layer to the second electrical end plate 507 to allow transfer of electrical energy therebetween. The electrical end plate 507 is shown as a single plate, with integral projections, but may also be a two (or more) part construction, as described in the second aspect, for example electrical end plate 1407 of FIG. 10.

It will be noted that the electrical stud 301 and the second electrical stud 505 are positioned at opposite ends of the stack of cell units. Two chimneys are present in the arrangement 500, and an electrical stud is aligned with each (e.g., preferably coaxial with each). The chimneys are defined/formed by the gaskets 304, ports through the cell units 306, and ports through either the first electrical end plate 302, first electrically insulating plate 305*a*, and top plate 303 or through the second electrical end plate 507, second electrically insulating plate 305*b*, and base plate 308. The first electrical end plate 302 blocks a first chimney (left side of FIG. 5A, by means of a base portion from which the electrical stud extends perpendicularly) and the second electrical end plate 507 blocks a second chimney (right side of FIG. 5A, by means of a base portion from which the electrical stud extends perpendicularly).

As indicated by the arrows in FIG. 5A, the first chimney is used for delivery of a first fluid to a first fluid volume, and the second chimney is used for exhaust of the first fluid volume. The first fluid volume is enclosed between the metal support plate 306*a* and the separator plate 306*b* of a cell unit 306 and supplied/exhausted by the chimneys. The second fluid volume may be provided surrounding the cell units and chimneys, enclosed by the skirt, base plate, and end plate, and to be in fluid communication with the outermost electrode of the electrochemically active layer 506. Ports for supply and exhaust of the second fluid volume may be provided in the base and/or end plate (not shown in FIG. 5A).

Further shown in FIG. 5A are support layers 511 provided between the power take of plate 302 and the first electrically insulating plate 305*a*, between the first electrically insulating plate 305*a* and the top plate 303, between the second electrical end plate 507 and the second electrically insulating plate 305*b*, and between the second electrically insulating plate 305*b* and the base plate 308. The support layers 511 have an extent which corresponds to the extent of (are in line with, and in plan view cover a corresponding plan view area to) the electrochemically active layers 506 (and protrusions in the separator plate 306*b*). The support layers 511 transfer a portion of the compression force applied between the base plate 308 and top plate 303 through the stack of cell units. This ensures good (for example even across the plan view area) electrical contact within cell units 306 and between adjacent cell units in the stack of cell units (i.e. good electrical contact between the down protrusions of the separator plate 306*b* toward the metal support plate 306*a* of the same cell unit 306, and good electrical contact between the up protrusions of the separator plate 306*b* toward the outermost electrode of the electrochemically active layer 506 of the adjacent, or neighboring, cell unit 306 in the stack of cell units). Naturally, the same compression force, via the support layers 511, provides good electrical contact between the first and second electrical end plates 302, 507 and the outermost cell units of the stack of cell units. The support layers 511 may be formed from any conductive or non-conductive resilient material capable of transmitting the compression force to the stack, for example a mesh or expanded metal foil.

Referring to FIG. 8, a partial skirt 307 is shown for clarity. It is to be understood that the skirt 307 may include a further two side walls to connect edges of the shown skirt components 307 such that the skirt surrounds the stack. Note also that the metal support plates 306*a* and separators 306*b* are not shown exploded, and so only the separators 306*b* are apparent in this view. The metal support plate 306*a* and separator 306*b* of a cell unit 306 are welded or otherwise affixed to one another around their periphery.

In use as a fuel cell, an electrical load may be connected between the electrical stud 301 and the second electrical stud 505 of the arrangement 500. In an example where the anode is the electrochemically active layer closest to the metal support plate 306*a*, the first fluid is fuel. The fuel is supplied to the anode via the first chimney, the gap between the metal support plate 306*a* and the separator 306*b*, and the porous region of the metal support plate 306*b*, and fuel exhaust products are routed from the anode, via the gap between the metal support plate 306*a* and the separator 306*b*, to the second chimney. The second fluid is oxidant and is supplied to the cathode via the second fluid volume.

In use as an electrolyser cell, a potential difference may be provided between the electrical stud 301 and the second electrical stud 505 and to provide electrical energy to the arrangement 500. Relevant fluids are provided to the first and second fluid volumes, and exhausted therefrom.

Figure 6A:
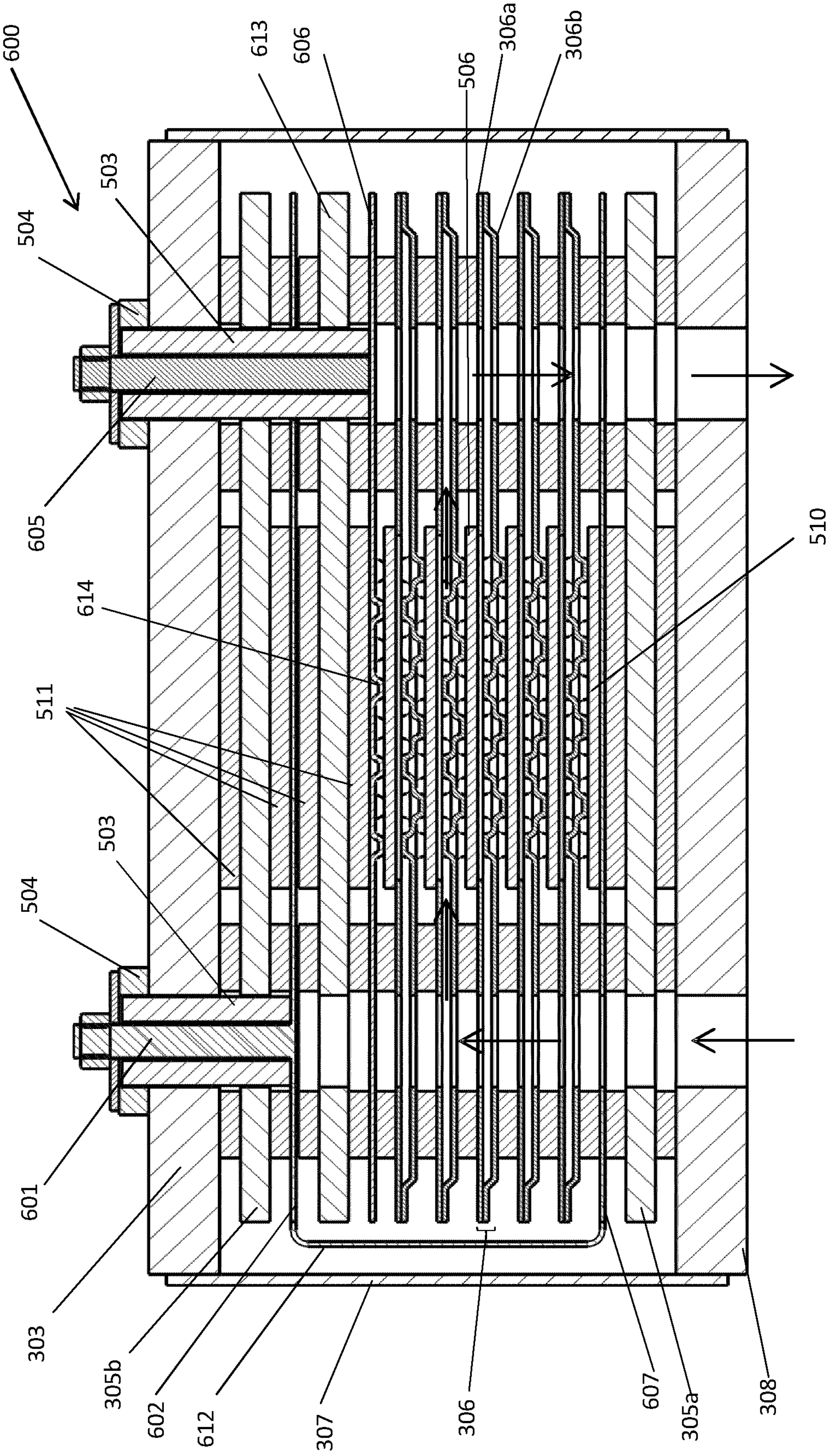
FIG. 6A a cross sectional view of a cell stack arrangement in accordance with the first aspect and FIGS. 6B and 6C are enlarged views of a portion of the cell stack arrangement of FIG. 6A.
Figure 6C:
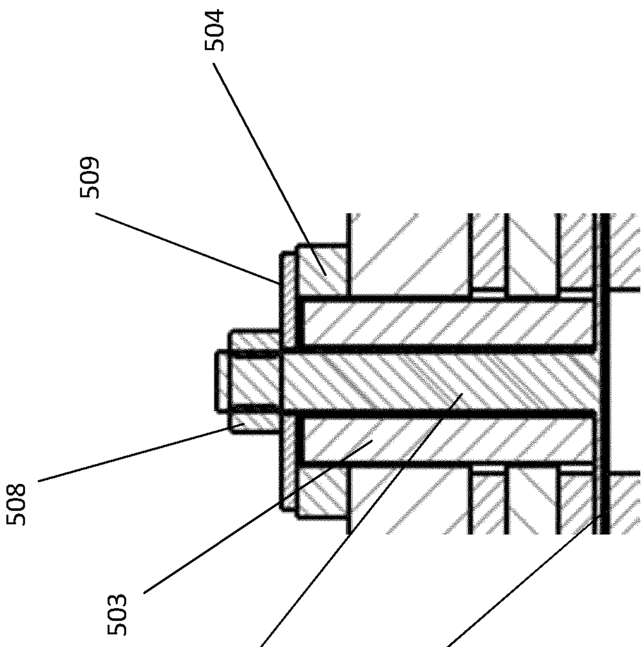
Figure 6B:
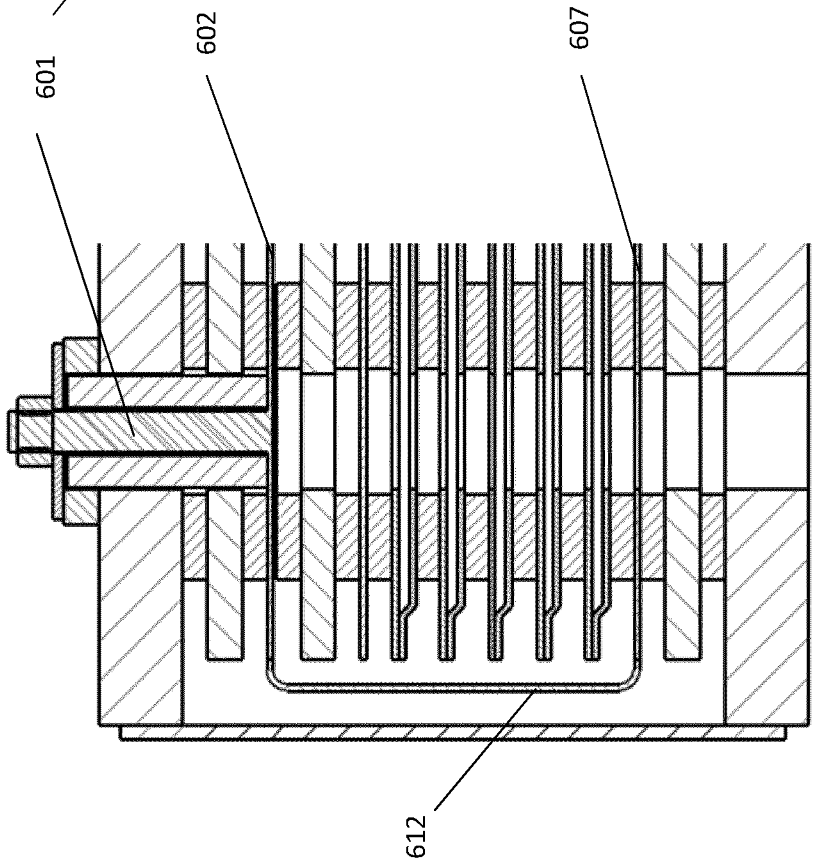
Figure 7:
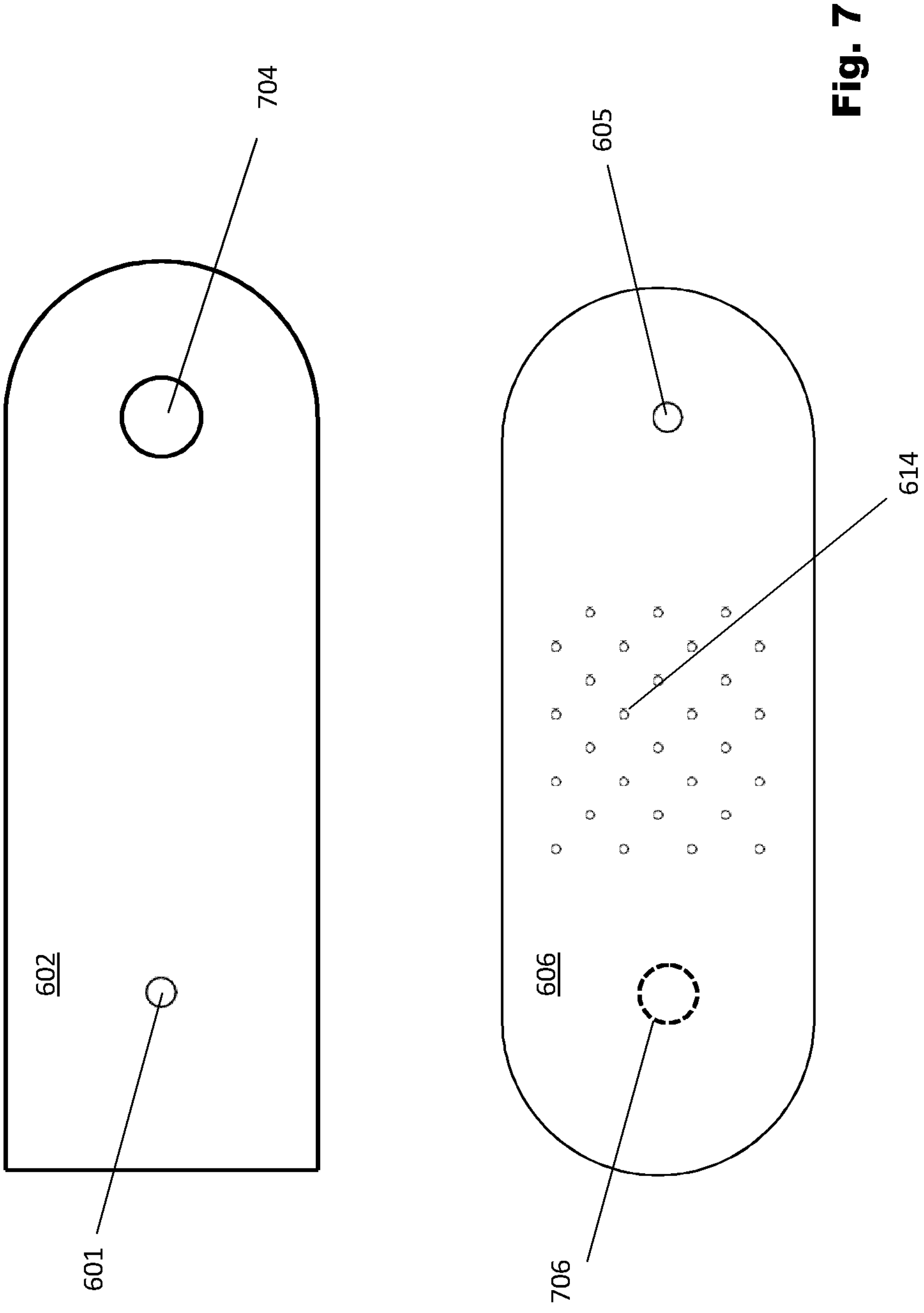
FIG. 7 is a plan view of the first electrical end plate and second electrical end plate in accordance with the first aspect.
Figure 9:
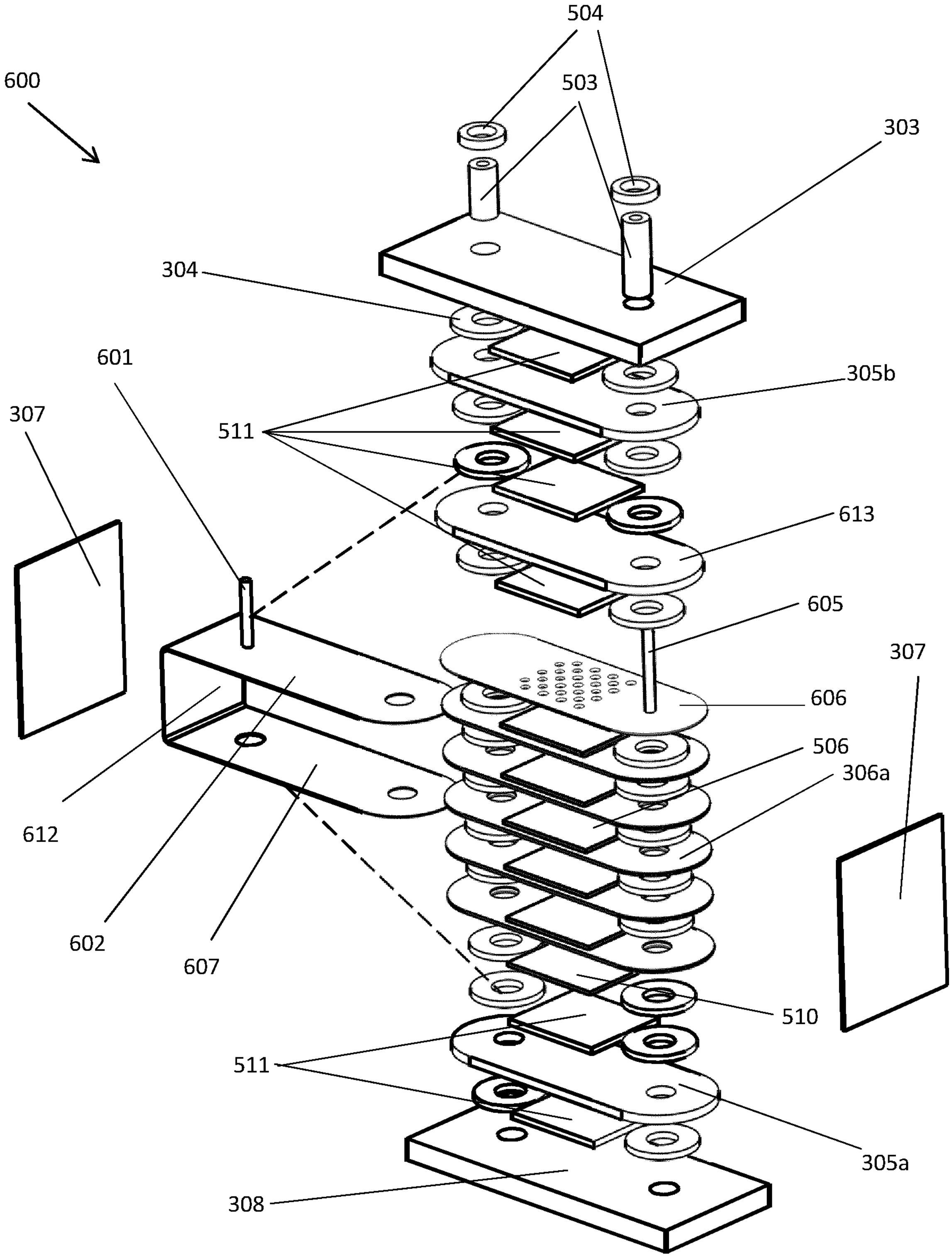
FIG. 9 is an exploded perspective view of the cell stack arrangement shown in FIG. 6A in accordance with the first aspect.

Referring to FIG. 6A, a cross sectional view of a cell stack arrangement 600 is shown. Cell stack arrangement 600 is a variant of the cell stack arrangement 500 of FIG. 5A. FIGS. 6B and 6C show zoomed areas of the cell stack arrangement 600 of FIG. 6A. FIG. 7 is a plan view of the first and second electrical end plates 602, 606 of the cell stack arrangement 600, each having a stud. FIG. 9 is an exploded perspective view of the arrangement 600 of FIGS. 6 and 7. Note that the arrangement 600 (including cell units 306 in the stack of cell units) is shown rotated by 180 degrees relative to the arrangement 500 shown in FIG. 5.

In the arrangement 600 shown in FIG. 6, first electrical end plate 602 with stud 601 is connected via an additional busbar 612 to an additional electrical end plate 607, which allows both electrical studs 601 and 605 to be positioned at the same end of the stack arrangement 600. It also allows fluid entry and exhaust from the first fluid volume to be positioned at the same end of the stack arrangement 600 (the fluid entry and exhaust being positioned to the opposite end of the stack arrangement 600 to the electrical studs 601, 605). Gaskets 304 are provided between each of the additional components of the arrangement 600 to define the chimneys or continuations thereof.

The second electrical stud 605 and associated second electrical end plate 606 are similar to the second electrical stud 505 and second electrical end plate 507 of the arrangement 500, with the exception that the second electrical stud 605 passes through openings in an additional electrically insulating plate 613 (for reasons outlined below) and through the first electrical end plate 602. Thus, the second electrical end plate 606 is provided with projections 614 towards and in contact with the outermost layer of the outermost cell unit 306 of the stack of cell units, which may be an outermost electrochemically active layer of the electrochemically active layers 506. The second electrical end plate 606 is shown as a single plate, with integral projections, but may also be a two (or more) part construction, as described in the second aspect, for example electrical end plate 1407 of FIG. 10.

A support layer 511 is positioned to the opposite side of the second electrical end plate 606 to the projections, between the second electrical end plate 606 and the additional electrically insulating plate 613 to maintain the compression within the electrochemically active region of the stack.

The first electrical stud 601 is connected to or unitary with the first electrical end plate 602, similar to the electrical stud 301 and first electrical end plate 302 of the arrangement 500.

Unlike arrangement 500, there is no electrically conductive ceramic layer 510 coated or deposited on the first electrical end plate 602. The first electrical end plate 602 is electrically connected to the busbar 612, which in turn is electrically connected to the additional electrical end plate 607 such that the two electrical end plates are at the same polarity and both subject to the compression forces exerted by the compression means, particularly in the vicinity of the chimneys. The additional electrical end plate 607 is positioned to the opposite end of the stack of cell units to the first electrical plate 602. The additional electrical end plate 607 is provided with a layer of material 510 deposited (e.g. as thin coatings/films) on—or attached to—and supported by the first electrical end plate 607. The layer of material 510 is otherwise similar to that described above with reference to FIG. 5.

The first electrical plate 602 is positioned between the additional electrically insulating plate 613 and the top plate 303 of the stack arrangement 600. The first electrical plate 602 is separated from the additional electrically insulating plate 613 by support layers 511 and gaskets 304. In other words, the first electrical plate 602 is positioned to the opposite side of the additional electrically insulating plate 613 from the second electrical end plate 606. The additional electrically insulating plate 613 thus provides electrical insulation between the first electrical plate 602 and the second electrical end plate 606. Similarly, the additional electrical end plate 607 is separated from the first electrically insulating plate 305*a* by support layers 511 and gaskets 304.

The busbar 612 is welded or otherwise affixed to (and in electrical connection with) the first electrical end plate 602 and the additional electrical end plate 607 via tabs on the ends of the busbar 612 and/or the first electrical end plate 602 and the additional electrical end plate 607. The busbar is positioned to one side of the stack of cell units, between the stack of cell units and the skirt, and is approximately parallel to a stacking direction of the same. The tabs are more flexible than (for example because they are thinner than) the busbar 612, first electrical end plate 602, and the additional electrical end plate 607, which means that differential thermal expansion between the stack and the busbar is accounted for by flexibility in the tabs, and so minimal stress is transferred to the busbar 612, first electrical end plate 602, and the additional electrical end plate 607.

Figure 10:
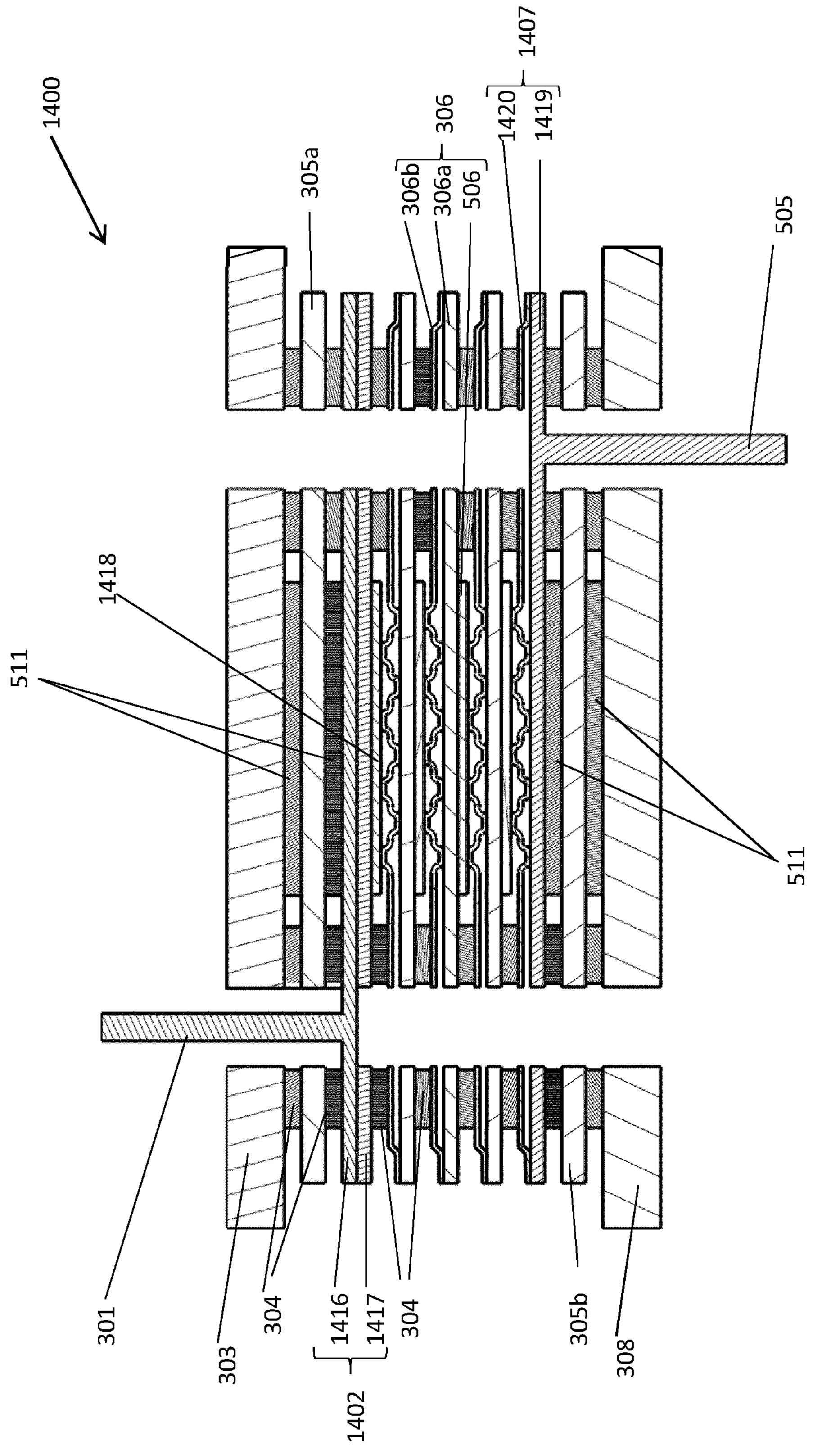
FIG. 10 is a cross sectional view of a cell stack arrangement in accordance with a second aspect the present invention.

The additional electrical end plate 607 is shown as a single plate upon which the layer of material 510 is affixed, coated, or deposited, but may also be a two (or more) part construction, similar to the plates described with respect to the second aspect, for example electrical end plate 1407 of FIG. 10.

It will be noted that in the example shown in FIG. 6A, the second electrical end plate 606 extends across both of the chimneys, so both end plates block the left hand side chimney and are compressed by compression forces in that chimney. In this case the first electrical plate 602 may be manufactured from the same material as the second electrical end plate 606 but may be thinner than the second electrical end plate 606 because it is not exposed to the fluid in the chimneys (typically fuel in a fuel cell application). Thus, where there are two electrical end plates, but one is exposed to dual atmospheres (two different fluids) in the stack, and the other a single atmosphere (one fluid), the latter plate may be made of a less corrosion resistant material, and/or have less or no corrosion protective coating and/or be made thinner than the former plate. Alternatively, if the second electrical end plate 606 does not additionally block the chimney to the left-hand side of FIG. 6A, the first electrical plate 602 and the second electrical end plate 606 may be manufactured from the same material and be of the same thickness, as both are exposed to similar (dual) chemical environments.

Referring to the partially exploded view of the arrangement 600 shown in FIG. 9, a partial skirt 307 is shown for clarity. It is to be understood that the skirt 307 may include a further two side walls to connect edges of the shown skirt components 307 such that the skirt surrounds the stack. Note also that the metal support plates 306*a* and separators 306*b* are not shown exploded, and so only the metal support plates 306*a* are apparent in this view. The metal support plate 306*a* and separator 306*b* of a cell unit 306 are welded or otherwise affixed to one another around their periphery. Note further that the additional electrical end plate 607, busbar 612, and first electrical end plate 602 are shown in their assembled (e.g. welded, brazed, or otherwise affixed together) form, dashed lines indicate the location in the exploded arrangement that the plate 607 and plate 602 occupy. Only once these plates are in position in the stack (and preferably once compression is applied to the stack) may the busbar 612 be affixed to the plate 607 and plate 602. Furthermore, electrically conductive ceramic layer 510 is shown separate to the additional electrical end plate 607, but it will be understood that frequently the electrically conductive ceramic layer 510 will be coated or deposited on the additional electrical end plate 607.

In use as a fuel cell, an electrical load may be connected between the electrical stud 601 and the second electrical stud 605 in the arrangement 600. In an example where the anode is the electrochemically active layer closest to the metal support plate 306*a*, the first fluid is fuel and flow within the first fluid volume is represented by the arrows in FIG. 6A. The fuel is supplied to the anode via the first chimney, the gap between the metal support plate 306*a* and the separator 306*b*, and the porous region of the metal support plate 306*b*, and exhaust products are routed from the anode, via the gap between the metal support plate 306*a* and the separator 306*b*, to the second chimney. The second fluid is oxidant and is supplied to the cathode via the second fluid volume.

In use as an electrolyser cell, a potential difference may be provided between the electrical stud 601 and the second electrical stud 605 and to provide electrical energy to the stack in the arrangement 600. Relevant fluids are provided to the first and second fluid volumes, and exhausted therefrom.

The arrangement 600 allows convenient electrical and fluidic connections to a system in which the cell stack arrangement 600 is positioned because all electrical connections are positioned to one end of the arrangement and all fluidic connections are positioned to the other end.

FIG. 7 shows plan views of the first electrical end plate 602 and second electrical end plate 606 of FIG. 6. The first electrical end plate 602 is provided with the electrical stud 601, to align with the first chimney in the cell stack arrangement 600. The first electrical end plate 602 is provided with an opening 704 through which the second electrical stud 605 and associated sleeve 503 passes. The end of the first electrical end plate 602 nearest to the electrical stud 601 may be straight for ease of attachment to the busbar 612.

The second electrical end plate 606 is provided with the second electrical stud 605, to align with the second chimney in the cell stack arrangement 600. A plurality of projections 614 are provided which project toward the outermost electrode of the electrochemically active layer of the outermost cell unit of the stack of cell units, to transfer power from the stack to the second electrical end plate 606. A port 706 may optionally be provided through the second electrical end plate 606. If the port 706 is provided, then it forms part of the first chimney, if the port is not provided then the second electrical end plate 606 blocks the first chimney. In the latter case, the second electrical end plate 606 blocks both chimneys.

DETAILED DESCRIPTION OF 2ND ASPECT

Figure 11:
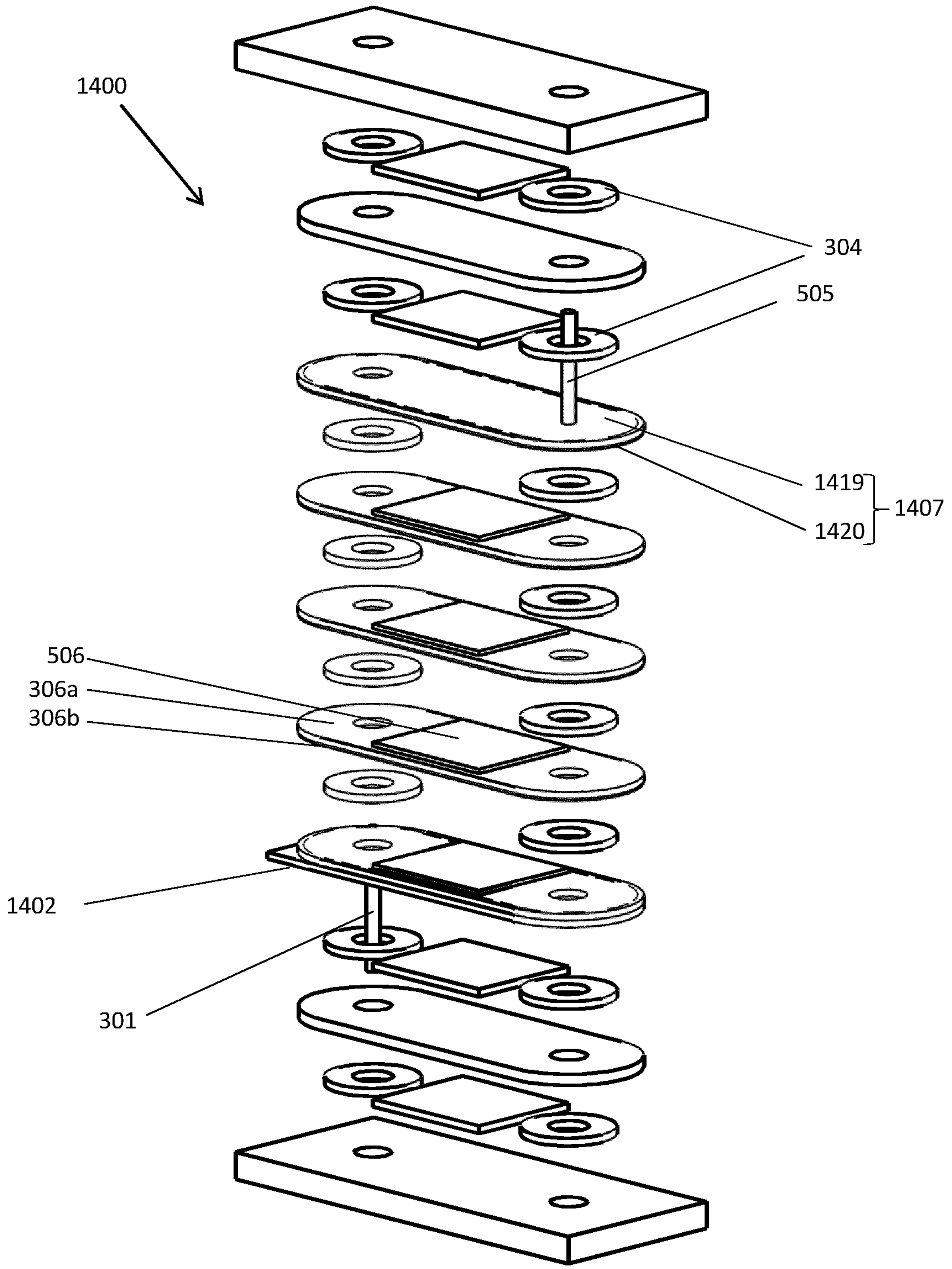
FIG. 11 is an exploded perspective view of the cell stack arrangement shown in FIG. 10.

Referring to FIG. 10, a cross sectional view of a cell stack arrangement 1400 is shown. Cell stack arrangement 1400 is a variant of the cell stack arrangement 500 of FIG. 5. FIG. 11 is an exploded perspective view of the arrangement 1400 of FIG. 10. Note that the compression means (for example skirt 307) is not shown in arrangement 1400 for sake of clarity.

Figure 12:
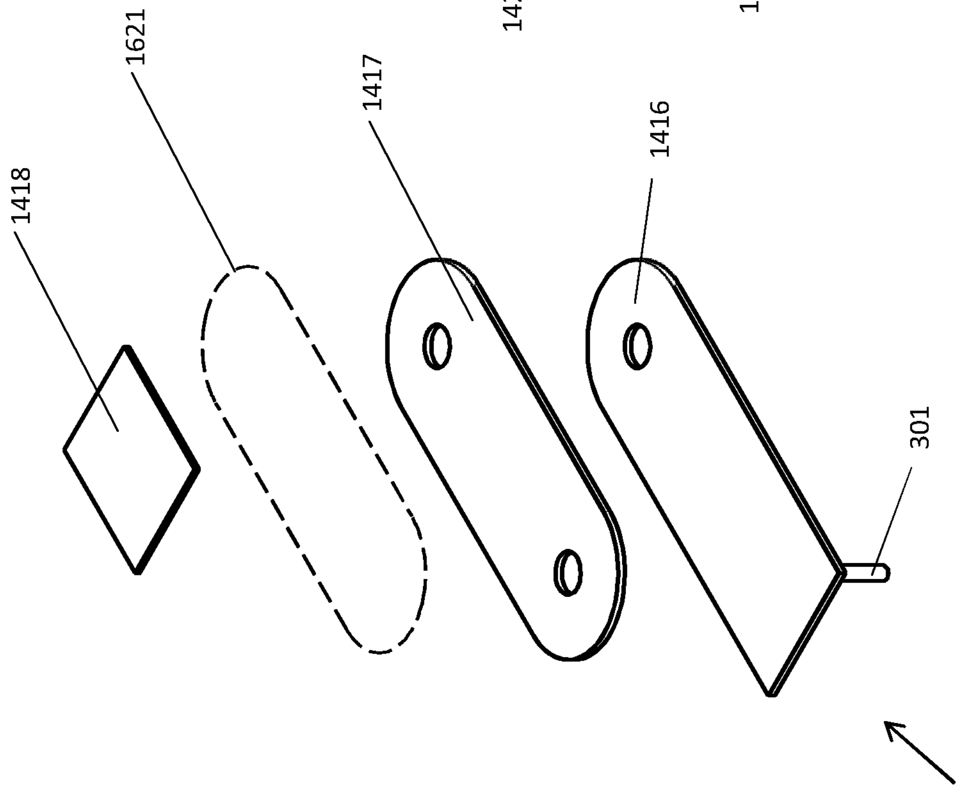
FIG. 12 is an exploded view of a first electrical end plate in accordance with the second aspect.
Figure 13:
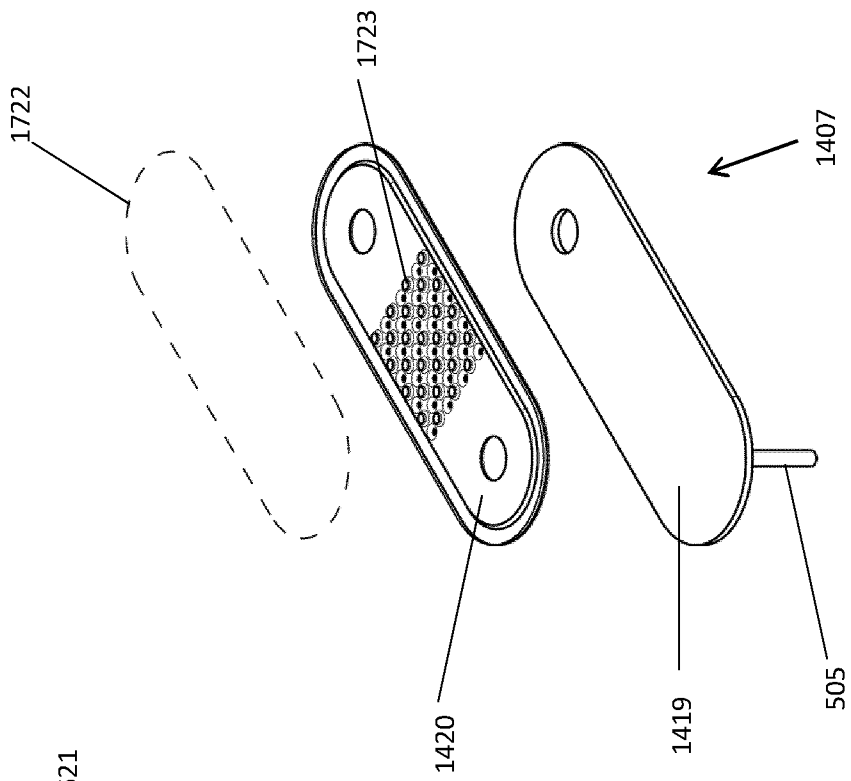
FIG. 13 is an exploded view of a second electrical end plate in accordance with the second aspect.

FIG. 12 is an exploded view of a first electrical end plate of the cell stack arrangement 1400. FIG. 13 is an exploded view of a second electrical end plate of the cell stack arrangement 1400.

In arrangement 1400 a first electrical end plate 1402 is shown, which may function substantially similarly to the first electrical end plate described above. The first electrical end plate 1402 comprises a two-layer construction in which a first layer 1416 is welded (or otherwise connected) to a second layer 1417 (the weld path is shown by a dashed line 1621 in FIG. 11 and FIG. 12). The first layer 1416 is a planar plate. The first layer 1416 blocks one of the chimneys of the cell stack arrangement (the electrical stud 301 exits the cell stack arrangement via a continuation of that blocked chimney) and is provided with a port which forms a part of another chimney for fluid delivery or exhaust of the first fluid volume.

It may be seen that the second layer 1417 is a planar plate. The second layer 1417 is similar to the metal support plate **306*a* of a cell unit 306 in the stack of cell units. The second layer 1417 is provided with (similarly positioned) ports in the same way as the metal support plates 306*a* in the stack of cell units. An electrically conductive ceramic layer 1418 is bonded (for example affixed to or deposited on) the opposite face of the second layer 1417 to that which faces the first layer 1416. The electrically conductive ceramic layer 1418 may be similar to the electrically conductive ceramic layer 510 described previously, and may be of a type of material suitable for use in a cathode of a fuel cell, for example LSCF, LCN, BSCF, e.g. LCN60. The thickness of the electrically conductive ceramic layer 1418 is similar to the thickness of the electrochemically active layers 506 of cell units 306 in the stack of cell units. This means that the gaskets 304 which separate the second layer 1417 from the separator plate 306*b* of the neighboring (outermost or uppermost) cell unit 306 of the stack of cell units can be identical to the gaskets 304 used elsewhere in the arrangement 1400**.

The face of the electrically conductive ceramic layer 1418 which is opposite to the second layer 1417 contacts projections on the separator plate **306*b* of the neighboring (outermost or uppermost) cell unit 306 of the stack of cell units. The projections on the separator plate 306*b* alternate in up-and-down directions, the up projections directed toward and in contact with the electrically conductive ceramic layer 1418 and away from the metal support plate 306*a* of the same cell unit 306, and the down projections directed away from the electrically conductive ceramic layer 1418 and toward and in contact with metal support plate 306*a* of the same cell unit 306. The down projections of the separator plate 306*b* contact the metal support plate 306*a* and so are electrically connected to the layer 506, which may be electrochemically active in which case the down projections of the separator plate are electrically connected to the electrode (typically the anode) of the electrochemically active layer closest to the metal support plate 306*a* (those electrochemically active layers being on the other side of the substrate). That electrical connection is enhanced by the welding of the metal support plate 306*a* and the separator plate 306*b* around their periphery. As a result, the electrical stud 301 is electrically connected to the stack of cell units via the first layer 1416, second layer 1417, and electrically conductive ceramic layer 1418**.

The arrangement 1400 also includes a second electrical end plate 1407, as shown in FIG. 10, which may function substantially similarly to the first electrical end plate 1402 described above. The second electrical end plate 1407 comprises a two-layer construction in which a first layer 1419 is welded (or otherwise connected) to a second layer 1420 (the weld path 1722 is shown by a dashed line in FIG. 11 and FIG. 13). The first layer 1419 is a planar plate. The first layer 1419 blocks one of the chimneys of the cell stack arrangement (the electrical stud 505 exits the cell stack arrangement via a continuation of that blocked chimney) and is provided with a port which forms a part of another chimney for fluid delivery or exhaust of the first fluid volume.

The second layer 1420 is similar to the separator plate **306*b* of a cell unit 306 in the stack of cell units. The second layer 1420 is provided with (similarly positioned) ports in the same way as the separator plates 306*b* in the stack of cell units. The second layer 1420 is welded or otherwise connected to the first layer 1419 around its periphery (and may also be welded around the ports). It may be seen that the second layer 1420 is a contoured plate (i.e. it has 3D features). The second layer 1420 is provided with projections which alternate in up-and-down directions, the up projections directed toward and in contact with the layer 506 (which may be an electrochemically active layer) of the neighboring (lowermost in the figure) cell unit 306 in the stack of cell units and away from the first layer 1419 of the electrical end plate 1407, and the down projections directed away from the neighboring (lowermost in the figure) cell unit 306 in the stack of cell units and toward and in contact with the first layer 1419 of the electrical end plate 1407. The up projections of the second layer 1420 contact the layer 506 of the neighboring (lowermost in the figure) cell unit 306 of the stack of cell units and so are electrically connected to the electrode (typically the cathode) of the neighboring (lowermost in the figure) cell unit 306. As a result, the electrical stud 505 is electrically connected to the stack of cell units via the first layer 1419 and the second layer 1420. The electrical studs 301 and 505** are affixed or otherwise connected at base portions of the respective electrical end plates in a similar manner to that described with respect to the first aspect above, the base portions being subjected to the compressions forces in the respective chimneys.

The first (1416, 1419) and second (1417, 1420) layers of the electrical end plates (1402, 1407) are iron-containing layers, for example the layers are steel (typically stainless steel, or ferritic stainless steel). Examples of suitable materials for the first layer include SS441 and Crofer 22 and examples of suitable materials for the second layer include SS441, SS444, and Crofer 22. The first and second layers are formed of different metals and are permanently connected. The first layer of the electrical end plate will have a thickness of at least 0.5 mm, for example between 0.5 mm and 5 mm, or between 0.5 and 2 mm, or between 1 and 2 mm.

The arrangement 1400 of FIG. 10 may be varied to provide both the first electrical stud 301 and second electrical stud 505 at the same end of the stack through use of a busbar and additional electrical plate, as described with respect to arrangement 600 in FIG. 6 of the first aspect.

FIG. 12 is an (artificially) exploded view of the first electrical end plate 1402. In FIG. 12, the first layer 1416 and the second layer 1417 are self-supporting rigid plates. The weld path 1621 is represented by the dashed line and follows the periphery of the second layer 1417 of the first electrical end plate 1402. Further weld path(s) (not shown) around the periphery of the fluid ports may also be present to prevent fluid flowing from the chimney formed by the respective port into the space between the first and second layers 1416, 1417 of the first electrical end plate 1420.

FIG. 13 is an (artificially) exploded view of the second electrical end plate 1407. In FIG. 13, the first layer 1419 and the second layer 1420 are self-supporting rigid plates. The weld path 1722 is represented by the dashed line and follows the periphery of the first layer 1419 and the second layer 1420 of the second electrical end plate. Also shown in FIG. 13 are the up-and-down projections 1723 of the second layer 1420 of the second electrical end plate 1407. Further weld path(s) (not shown) around the periphery of the fluid ports may also be present to prevent fluid flowing from the chimney formed by the respective port into the space between the first and second layers 1419, 1420 of the second electrical end plate 1407.

Figure 14:
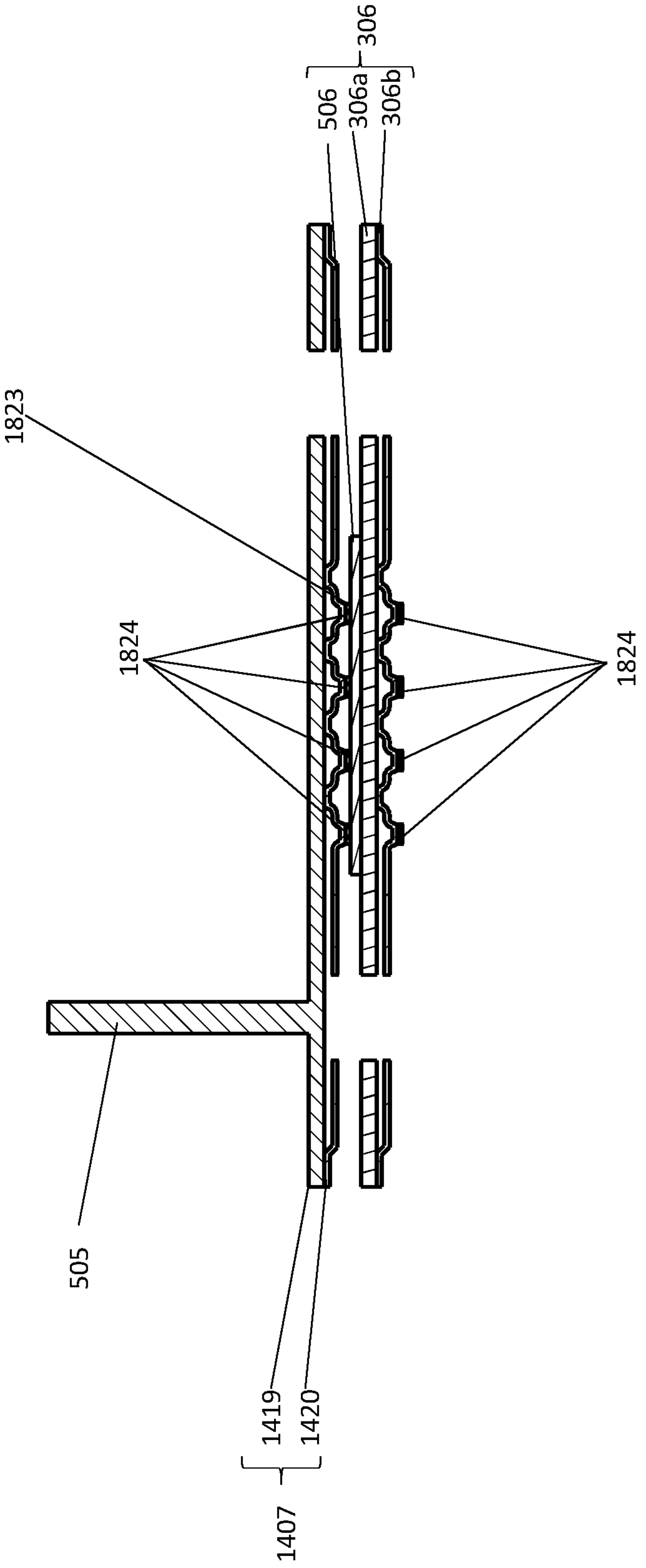
FIG. 14 is a cross sectional view of a portion of a cell stack arrangement in accordance with the second aspect.

Referring to FIG. 14, a cross sectional view of a portion of a cell stack arrangement is shown. The portion of a cell stack arrangement is a variant of the electrical stud 505, second electrical end plate 1407 and neighboring (lowermost in FIG. 10) cell unit 306 in the stack of cell units in the cell stack arrangement 1400 of FIG. 10.

In the variant shown in FIG. 14, the projections 1723 of the second layer 1420 of the second electrical end plate 1407 which are directed toward the layers 506 of the neighboring cell unit 306 of the stack of cell units are provided with a conductive ceramic layer 1824. The projections of the separator plate 306*b* of each cell unit 306 which are directed toward the electrochemically active layers of the neighboring cell unit 306 of the stack of cell units are also provided with a conductive ceramic layer 1824. The conductive ceramic layers 1824 are bonded or deposited to said projections.

The conductive ceramic layers 1824 are in face-to-face contact with the layers 506 of the neighboring cell unit 306 of the stack of cell units, and provide improved electrical contact between the projections (and therefore separator plate 306*b* or second plate 1420) and the layers 506. When the layers 506 are electrochemically active layers of a cell unit, the outermost electrode of the neighboring cell unit is typically the cathode, and a cathode-type material is used for the conductive ceramic layers 1824, such as LSCF, LCN, BSCF.

Figure 15:
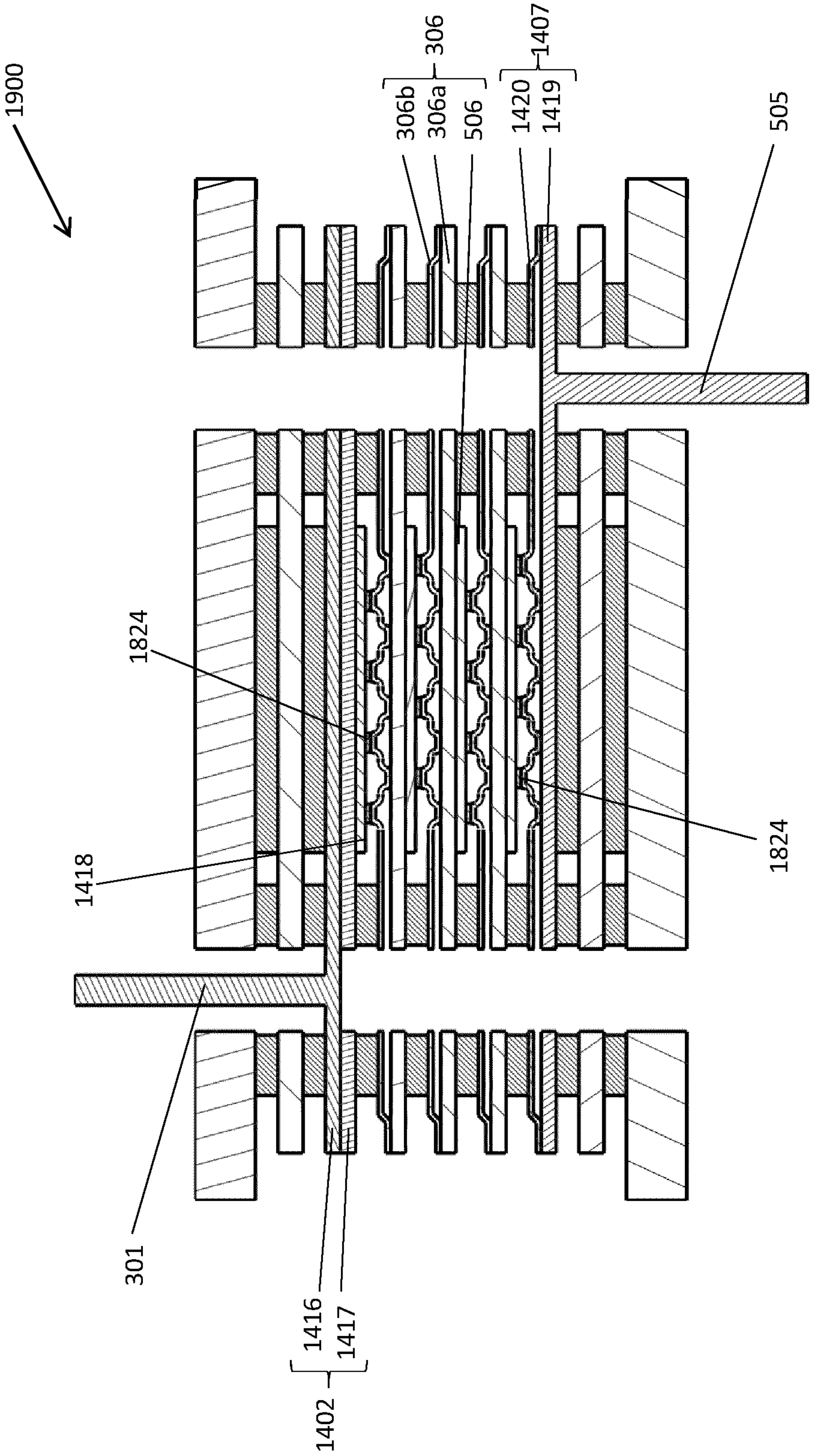
FIG. 15 is a cross sectional view of a portion of a cell stack arrangement in accordance with the second aspect.

FIG. 15 shows the second electrical end plate 1407 and conductive ceramic layers 1824 as part of a cell stack arrangement 1900. Cell stack arrangement 1900 is a variant of the arrangement 1400 of FIG. 10. FIG. 15 additionally shows conductive ceramic layers 1824 which are bonded to or deposited on the up projections of the separator plate 306*b* of the uppermost cell unit 306 in the stack of cell units contacting the electrically conductive ceramic layer 1418 of the first electrical end plate 1402. These conductive ceramic layers 1824 provide good electrical connection between the first electrical end plate 1402 and the neighboring (uppermost in FIG. 15) cell unit of the stack of cell units.

The present invention is not limited to the above examples only, and other examples will be readily apparent to one of ordinary skill in the art without departing from the scope of the appended claims.

These and other features of the present invention have been described above purely by way of example. Modifications in detail may be made to the invention within the scope of the claims.

The invention claimed is:

1. An electrochemical cell assembly comprising:

a base plate and a top plate between which a stack of planar cell units and at least one electrical end plate are disposed in compression, wherein:

the electrical end plate comprises a two-plate construction in which a first plate and a second plate formed of different respective materials are permanently connected together to form a single conductive body, the first plate disposed between the second plate and the top plate, the first plate of the electrical end plate is electrically connected to an external electrical terminal of the cell assembly, and the second plate of the electrical end plate has an outwardly facing side having a first electrically conductive ceramic layer bonded thereto that is in face-to-face abutment with, and in electrical contact with, an adjacent cell unit.

2. The assembly according to claim 1, wherein the adjacent cell unit has a second electrically conductive ceramic layer bonded to the side which is in face-to-face abutment with the first electrically conductive ceramic layer of the electrical end plate, and the first and second electrically conductive ceramic layers are made of the same material.

3. The assembly according to claim 1, wherein the first electrically conductive ceramic layer of the electrical end plate has a thickness selected such that the spacing between the at least one electrical end plate and the adjacent cell unit is the same as the spacing between the remaining cell units of the stack.

4. The assembly according to claim 1, wherein the stack comprises electrochemically active cell units, each of which comprise a separator plate and a cell-supporting metal substrate plate.

5. The assembly according to claim 4, wherein the second plate of the electrical end plate is made of the same material as the separator plate.

6. The assembly according to claim 4, wherein the second plate of the electrical end plate has essentially the same configuration as the separator plate.

7. The assembly according to claim 1, wherein the second plate of the electrical end plate has a 3D contoured construction with a series of projections extending outwardly so as to abut the adjacent cell unit, over which projections the first electrically conductive ceramic layer extends as a discontinuous layer bonded thereto.

8. The assembly according to claim 5, wherein the first electrically conductive ceramic layer is made of the same material as a second electrically conductive ceramic layer bonded to a metal substrate plate of the adjacent cell unit that is in face-to-face abutment with the first electrically conductive ceramic layer.

9. The assembly according to claim 8, wherein the adjacent cell unit is electrochemically active, and the second electrically conductive ceramic layer comprises an outermost electrode layer of an electrochemically active cell layer bonded to the metal substrate plate of the adjacent cell unit.

10. The assembly according to claim 8, wherein the adjacent cell unit is electrochemically inactive, and the second electrically conductive ceramic layer is an electrode material layer that is bonded to the metal substrate plate of the adjacent cell unit.

11. The assembly according to claim 4, wherein the second plate of the electrical end plate is made of the same material as the cell-supporting metal substrate plate.

12. The assembly according to claim 4, wherein the second plate of the electrical end plate has essentially the same configuration as the cell-supporting metal substrate plate.

13. The assembly according to claim 1, wherein the second plate of the electrical end plate has a flat outwardly facing side with the first electrically conductive ceramic layer comprising a continuous layer bonded thereto.

14. The assembly according to claim 4, wherein the first electrically conductive ceramic layer is made of the same material as a second electrically conductive ceramic layer bonded to a separator plate of the adjacent cell unit that is in face-to-face abutment with the first electrically conductive ceramic layer.

15. The assembly according to claim 5, further comprising a second electrical end plate comprising a two-plate construction in which a third plate and a fourth plate formed of different respective materials are permanently connected together to form a single conductive body, wherein the third plate is electrically connected to an external electrical terminal of the cell assembly, wherein the fourth plate has an outwardly facing side having a third electrically conductive ceramic layer bonded thereto that is in face-to-face abutment with, and in electrical contact with, an adjacent cell unit, wherein the third electrically conductive ceramic layer is made of the same material as a fourth electrically conductive ceramic layer bonded to a separator plate of the adjacent cell unit that is in face-to-face abutment with the third electrically conductive ceramic layer.

16. The assembly according to claim 1, wherein the electrochemical cells comprise planar, solid oxide, fuel cell or electrolyser cell units.

17. The assembly according to claim 1, wherein the first plate is directly connected to the second plate.

* * * * *